US010189647B2

(12) United States Patent
Lurie et al.

(10) Patent No.: US 10,189,647 B2
(45) Date of Patent: *Jan. 29, 2019

(54) BELT-ON-BELT DRIVES FOR STEEPLY-SLOPED PORTIONS OF LONG CONVEYORS

(71) Applicant: THYSSENKRUPP INDUSTRIAL SOLUTIONS (USA), INC., Greenwood Village, CO (US)

(72) Inventors: Martin S. Lurie, Englewood, CO (US); R. Steven Kasper, Parker, CO (US)

(73) Assignee: THYSSENKRUPP INDUSTRIAL SOLUTIONS (USA), INC., Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,686

(22) Filed: Aug. 15, 2017

(65) Prior Publication Data
US 2017/0341870 A1 Nov. 30, 2017

Related U.S. Application Data

(63) Continuation-in-part of application No. 14/765,126, filed as application No. PCT/US2014/014504 on Feb. 3, 2014, now Pat. No. 9,731,901.
(Continued)

(51) Int. Cl.
*B65G 15/08* (2006.01)
*B65G 23/14* (2006.01)
(Continued)

(52) U.S. Cl.
CPC .......... *B65G 23/14* (2013.01); *B65G 15/08* (2013.01); *B65G 15/18* (2013.01); *B65G 15/60* (2013.01); *B65G 23/16* (2013.01)

(58) Field of Classification Search
None
See application file for complete search history.

(56) References Cited

U.S. PATENT DOCUMENTS

| 508,589 A | 11/1893 | Wishard |
| 1,313,111 A | 8/1919 | Page |

(Continued)

FOREIGN PATENT DOCUMENTS

| CA | 2238540 A | 11/1999 |
| CN | 201158545 Y | 12/2008 |
| GB | 1500909 | 2/1978 |

OTHER PUBLICATIONS

International Search Report issued in PCT/US2014/014496, dated May 19, 2014.
English abstract of CN201158545Y.

*Primary Examiner* — William R Harp
(74) *Attorney, Agent, or Firm* — thyssenkrupp North America, Inc.

(57) ABSTRACT

A conveyor system, at least a portion of which may traverse a continuous slope sufficiently steep such that tensile forces associated with overcoming the effects of the slope are several times larger per unit length of run than tensile forces per unit length of run due to main frictional resistance of the conveyor system, may include a belt-on-belt drive. The belt-on-belt drive may include at least one internal belt configured to operably engage the carry belt of the conveyor system so as to frictionally drive the carry belt over at least a one-third length of the sloped run. At the portion of the external belt driven by the at least one internal belt, the rate of tension change in the external belt may be configured to be approximately zero or a modest rise. In some embodiments, the longitudinal stiffness of the at least one internal belt may be substantially greater than the external belt's longitudinal stiffness.

19 Claims, 15 Drawing Sheets

Related U.S. Application Data

(60) Provisional application No. 61/916,028, filed on Dec. 13, 2013, provisional application No. 61/784,567, filed on Mar. 14, 2013, provisional application No. 61/759,843, filed on Feb. 1, 2013.

(51) Int. Cl.
*B65G 15/18* (2006.01)
*B65G 15/60* (2006.01)
*B65G 23/16* (2006.01)

(56) References Cited

U.S. PATENT DOCUMENTS

| | | |
|---|---|---|
| 1,970,842 A | 8/1934 | Crossen |
| 3,268,065 A | 8/1966 | Thomson |
| 3,343,653 A | 9/1967 | Thomson |
| 3,351,179 A | 11/1967 | Thomson |
| 3,869,574 A | 3/1975 | Kume |
| 3,994,390 A | 11/1976 | Peterson, Jr. |
| 4,234,078 A | 11/1980 | Nott |
| 4,574,943 A | 3/1986 | Green |
| 6,868,747 B2 | 3/2005 | Göser |
| 2006/0027438 A1 | 2/2006 | Fargo |
| 2009/0242359 A1 | 10/2009 | Steinstrater et al. |

BELT-ON-BELT DRIVES FOR STEEPLY-SLOPED PORTIONS OF LONG CONVEYORS

CROSS-REFERENCE TO RELATED APPLICATIONS

This application is a Continuation-in-Part of U.S. patent application Ser. No. 14/765,126, entitled "BELT-ON-BELT DRIVES FOR STEEPLY-SLOPED PORTIONS OF LONG CONVEYORS" and filed on Jul. 31, 2015, which is a National Stage Application of PCT/US2014/014504, and filed on Feb. 3, 2014, which claims priority to U.S. provisional application No. 61/759,843, entitled "BELT-ON-BELT DRIVES FOR STEEPLY-SLOPED PORTIONS OF LONG CONVEYORS" and filed on Feb. 1, 2013, to U.S. provisional application No. 61/784,567, entitled "BELT-ON-BELT DRIVES FOR STEEPLY-SLOPED PORTIONS OF LONG CONVEYORS" and filed on Mar. 14, 2013, and to U.S. provisional application No. 61/916,028, entitled "BELT-ON-BELT DRIVES FOR STEEPLY-SLOPED PORTIONS OF LONG CONVEYORS" and filed on Dec. 13, 2013, each of which is hereby incorporated by reference herein in their entirety.

TECHNOLOGICAL FIELD

The technological field generally relates to conveyors, and more particularly to belt-on-belt drives for long conveyors for use in conveying bulk materials.

BACKGROUND

In the field of conveying bulk materials by endless-belt conveyors, it is desirable to have as few separate flights as possible making up a conveying system, for reasons of capital and operating cost as well as reliability. A key limitation on the length or lift that can be achieved with a single conveyor flight is the tensile strength of the conveyor belt. On long overland conveyors, the accumulation of frictional losses together with the forces required to either elevate or lower the load eventually builds to a point where the tension in the conveyor belt reaches a maximum allowable level for the belt's tension-carrying members, dictating the limit on the length of the conveyor. On conveyors that run on a substantial incline, the forces required to hold the belt and its load on the slope are the dominant forces that determine what distance of slope the conveyor can traverse before the tensile capacity of the belt is exceeded.

One possible approach to increase the maximum achievable length of single conveyor flights is to provide discrete, relatively short belt-on-belt booster drives intermediate the head and tail pulleys of a conveyor in the form of secondary or internal belt conveyors that frictionally engage the underside of the main or carry belt. This type of arrangement is shown in FIG. 1. FIG. 2 shows a tension plot for the carry belt 102 of the conveyor system 100 of FIG. 1, where the tension in the carry belt 102 falls as the carry belt 102 passes over each booster section or booster drive 104. In practice, the length of each internal belt 106 is kept as short as possible so as not to incur excessive cost due to the duplication of belting. As such, the length of each booster drive 104 comprises only a small fraction of the overall length of the main conveyor 100. The length of the tension-transfer segments 108 shown in FIG. 2 would be much shorter and steeper in practice than suggested by FIG. 2.

The arrangement shown in FIG. 1 suffers from serious or fatal disadvantages. Excessive slack belt can be introduced by the booster section 104 over-driving the carry belt 102, which has led to catastrophic failures on long overland conveyors. In addition, it is known in the field that belt-on-belt drives can reliably transfer no more than one horsepower per longitudinal foot of belt-on-belt drive, which has made it counterintuitive to try and apply belt-on-belt drives to slope conveyors as the slope portions consume high rates of power. Furthermore, each booster unit 104, situated remotely from the main conveyor's head or tail locations 110, 112, requires a supply of power and a set of ancillary infrastructure, which poses challenges for inspection, maintenance and safety practices and adds substantially to the capital and operating costs of the conveyor system.

Another arrangement applying belt-on-belt friction drives is shown in FIG. 3. However, this arrangement is used to separate the wearing elements of the conveyor belt from the tension-carrying elements. The upper "carry" belt 202, which has a relatively low level of tensile capacity, is optimized to economically absorb the wear and impact involved in receiving and carrying the bulk material 204. The tension-carrying function is provided by the second or internal belt 206 arranged internally to the upper belt 202. The head pulley 208 of the upper belt 202 may be a non-driven pulley, or supply only a very small fraction of the total power required to drive the conveyor system 200. Almost all of the power required to drive the conveyor system 200 is applied through the pulley 210 of the inner belt 206. These types of conveyor systems do not enable the overall length of the conveyor to be any longer than a conventional single-belt system.

It is therefore desirable to provide a conveyor system, in particular an improved conveyor system implementing belt-on-belt drives, that addresses the above described problems and/or that offers improvements over existing belt-on-belt conveyor systems.

SUMMARY

Described herein are conveyor systems for conveying bulk materials and related control systems.

In some examples of the conveyor system, at least one portion of the conveyor system may traverse a continuous slope. The continuous slope may be sufficiently steep such that tensile forces associated with overcoming the effects of the continuous slope may be several times larger per unit length of run than tensile forces per unit length of run due to the main frictional resistance of the conveyor system. The conveyor system may include an external belt and at least one internal belt. The external belt may define a continuous loop. The continuous loop may traverse the entire route of the conveyor system and be configured to carry material load to be transported across the entire route. The at least one internal belt may be positioned inside the continuous loop of the external belt and may traverse at least a portion of the continuous slope. An upper side of the at least one internal belt may be configured to operably engage an underside of the external belt so as to frictionally drive a portion of the external belt. A longitudinal stiffness of the at least one internal belt may be greater than a longitudinal stiffness of the external belt. The longitudinal stiffness of the at least one internal belt may be at least two times greater than the longitudinal stiffness of the external belt, and preferably the longitudinal stiffness of the at least one internal belt may be approximately three to five times greater than the longitudinal stiffness of the external belt.

In some examples, at the portion of the external belt driven by the at least one internal belt, the rate of tension rise in the external belt may be configured to be approximately zero or a modestly higher rate.

In some examples, at the portion of the external belt driven by the at least one internal belt, most, if not all, of the tension required to carry the material load and the weight of the external belt on the slope, and a portion of the main frictional resistance accrued by the external belt in riding on the at least one internal belt, may be transferred to and accrued by the at least one internal belt.

In some examples, approximately more than half the length of the conveyor system may traverse the continuous slope.

In some examples, the at least one internal belt may traverse approximately an upper half of the continuous slope.

In some examples, a head pulley of the at least one internal belt may be positioned close enough to a head pulley of the external belt so as to minimize the risk of excessive belt sag in a portion of the conveyor system between the two head pulleys.

In some examples, at least one of the external belt or the at least one internal belt may carry between a third and a half of the total conveyor tension accrued over the course of the slope.

In some examples, the external belt and the at least one internal belt may have substantial longitudinal strength.

In some examples, the external belt and the at least one internal belt may have substantially similar allowable tension ratings.

In some examples, the external belt and the at least one internal belt may include steel-cord belts.

In some examples, the external belt and the at least one internal belt may have substantially similar width dimensions.

In some examples, the at least one internal belt may be configured to transition from a substantially flat configuration to a substantially fully troughed configuration at a tail of the at least one internal belt to operably engage the external belt. The at least one internal belt, may be configured to transition from the substantially fully troughed configuration to the substantially flat configuration at a head of the at least one internal belt to operably disengage the external belt.

In some examples, a trough of the external belt may be configured to descend onto a trough of the at least one internal belt.

In some examples, the external belt may form into a trough with steeper sides proximate to the area of engagement.

In some examples, the conveyor system may further include a plurality of carry idlers. The spacing between the carry idlers adjacent to the area of engagement may be greater than the spacing between the other carry idlers.

In some examples, the conveyor system may further include a plurality of carry idlers. The spacing between the carry idlers adjacent to the area of engagement may be less than the spacing between the other carry idlers.

In some examples, the conveyor system may further include a plurality of carry idlers. The spacing between the carry idlers adjacent to the area of engagement may be different than the spacing between the other carry idlers.

In some examples, the conveyor system may further include a support mechanism. The support mechanism may facilitate at least one transition length of engagement or disengagement of the external belt and the at least one internal belt. The support mechanism may include at least one of air-support panels, slider pads, or small-diameter idlers.

In some examples, the support mechanism may be supported from above such that at least portions of lateral trough walls of the at least one internal belt may be in close proximity to at least portions of lateral trough walls of the external belt.

In some examples, the external belt may be flattened to facilitate engaging and/or disengaging the at least one internal belt.

In some examples, the conveyor system may further include a cover belt configured to form an inverted trough to contain a material load on the flattened external belt.

In some examples, the conveyor system may further include a control system. The external belt may include a head pulley. The at least one internal belt may include a head pulley. The control system may control the speed of at least one of the head pulley of the external belt or the head pulley of the at least one internal belt to achieve correct progression of each belt.

In some examples, the control system may control the external belt and the at least one internal belt to progress at a substantially similar speed.

In some examples, the control system may control the torque directed to at least one of the head pulley of the external belt or the head pulley of the at least one internal belt to ensure that each belt may carry a proportionate share of the total tension and that the friction capacity of the belt-on-belt interface may not be exceeded.

In some examples, the conveyor system may further include a belt scale. The belt scale may be installed near a tail of the conveyor system. The belt scale may be configured to continuously measure the mass of payload passing over. The control system may include a load profile component and a drive control component. The load profile component may use measurements by the belt scale to calculate a load profile of the entire conveyor system. The drive control component may use the load profile of the entire conveyor system to proportion load to the drive pulleys for the at least one internal belt and for the external belt to ensure that each pulley may be driving to the appropriate extent.

In some examples, the conveyor system may further include a load-superposition mechanism upstream of a drive pulley of the at least one internal belt for temporarily superimposing an artificial load onto empty portions of the external belt.

In some examples, the load-superposition mechanism may include a frame. The frame may include a plurality of wheels and an actuator operably associated with the frame.

In some examples, the frame may include a plurality of elongated members pivotally joined together. The actuator may be operably associated with a pivot joint of two adjacent elongated members.

In some examples, each of the plurality of wheels may be vertically aligned with a carry idler supporting the belts.

In some examples, each of the plurality of wheels may include a tire inflatable from a central system.

In some examples, the load-superposition mechanism may include a plurality of bladders. The plurality of bladders may be configured to be placed end-to-end on the conveyor system and may be fillable with water. Each of the plurality of bladders may be contained in a sling and harness arrangement.

In some examples, the at least one portion of the conveyor system traversing the continuous slope may be remote from terminal points of the conveyor system. A substantial portion of the conveyor system may traverse a relatively horizontal path.

In some examples, the at least one internal belt may traverse a substantial portion of the continuous slope.

In some examples, a drive of the at least one internal belt may be at least partially controlled by reference to a tension measured in the external belt just downstream of a head pulley drive of the at least one internal belt.

In some examples, the at least one internal belt may be configured to carry most of a total tension accrued over the course of the slope.

In some examples, a maximum tension carried by the at least one internal belt may be equal to or greater than a maximum tension carried by the external belt.

In some examples, the conveyor system may further include at least one second internal belt. The second internal belt may be positioned inside the continuous loop of the external belt. The at least one internal belt and the at least one second internal belt may be arranged end-to-end along the continuous slope.

In some examples, driving pulleys of the at least one internal belt and the at least one second internal belt may be situated in proximity to each other at a location where the two internal belts may abut one another.

In some examples, one of the two internal belts may be configured as a head-drive belt. The other may be configured as a tail-drive belt.

In some examples, the tail-drive internal belt may include a drive pulley, a tail pulley downstream of the drive pulley, and a take-up pulley between the drive pulley and the tail pulley.

In some other examples of the conveyor system, a substantial portion of the conveyor system may traverse a relatively horizontal path. At least one of a head portion or a tail portion of the conveyor system may traverse a slope. The slope may be sufficiently steep such that tensile forces associated with overcoming the effects of the slope may be several times larger per unit length of run than tensile forces per unit length of run due to main frictional resistance of the conveyor system. The conveyor system may include an external belt. The external belt may define a continuous loop. The continuous loop may traverse the entire route of the conveyor system. The external belt may be configured to carry material load to be transported across the entire route. The conveyor system may further include a belt-on-belt friction drive. The belt-on-belt friction drive may traverse a substantial portion of the slope at the head and/or tail portions of the conveyor. The belt-on-belt friction drive may include at least one internal belt positioned inside the continuous loop of the external belt.

In some examples, at the portion of the external belt driven by the at least one internal belt, the rate of tension rise in the external belt may be approximately zero or a modestly higher rate.

In some examples, at the portion of the external belt driven by the at least one internal belt, most if not all of the tension required to carry the material load and the weight of the external belt on the slope, and a portion of the main frictional resistance accrued by the external belt in riding on the at least one internal belt, may be transferred to and accrued by the at least one internal belt.

In some examples, at the portion of the external belt driven by the at least one internal belt, the greater part of the tension required to carry the material load and the weight of the external belt on the slope, and a portion of the main frictional resistance accrued by the external belt in riding on the at least one internal belt, may be transferred to and accrued by the at least one internal belt. In these examples, drive pulleys moving the external belt may be controlled to exert an external driveset torque, and drive pulleys moving the internal belt may be controlled to exert an internal driveset torque. Further in these examples, the external driveset torque may comprise a first torque portion sufficient to move that part of the mass that IS NOT over the internal belt, as well as a second torque portion sufficient to move a share of that part of the mass that IS over the internal belt, and the ratio of the second torque portion to the internal driveset torque may be controlled to be substantially the same as the ratio of the longitudinal stiffness of the external belt to the longitudinal stiffness of the internal belt.

In some examples, the belt-on-belt friction drive further may include at least one second internal belt. One of the two internal belts may traverse a continuous slope at the tail portion of the conveyor system. The other of the two internal belts may traverse a continuous slope at the head portion of the conveyor system. A head pulley of one of the two internal belts may be configured to be close enough to a head pulley of the external belt so as to minimize the risk of excessive belt sag in a portion of the conveyor between the two head pulleys.

In some examples, a drive of the other one of the two inner belts may be at least partially controlled by reference to the tension measured in the external belt just downstream of a head pulley drive of the internal belt.

In some examples, the two internal belts each may carry most of the total tension accrued over the course of each slope.

In some examples, a maximum tension carried by each of the internal belts may be equal to or greater than a maximum tension carried by the external belt.

In some examples, the at least one internal belt located at the tail portion of the conveyor system may include a drive pulley situated near a tail pulley of the external belt, a tail pulley, and a take-up pulley between the drive pulley and the tail pulley.

DETAILED DESCRIPTION

Described herein are conveyor systems for conveying bulk materials and methods of implementing the systems. The conveyor systems may include an external carry belt and one or more internal friction drive belts. The external belt may span over terrain that include one or more sloped sections. The one or more sloped sections may be sufficiently steep such that tensile forces associated with overcoming the effects of the continuous slope may be several times greater per unit length of run than tensile forces per unit length of run due to main frictional resistance of the conveyor system. The one or more internal belts may be provided over substantial lengths of the steep runs of the conveyor. The internal belts may be configured to carry most of the incremental tension that may accumulate in the belts within the sloped section, thereby relieving the external belt from accruing additional tension over the course of the slope. The external belt and the internal belt maya have substantial longitudinal strength and similar width dimensions. Also described herein are mechanisms that facilitate the transitioning of the internal belt into the carry trough of the external belt, and mechanisms that unload the external belt if one of the internal or external belts fails. By using the conveyor systems described herein, a longer conveying distance with one or more sloped sections, which would usually require multiple conventionally constructed conveyors each configured with high tension rating belts, may be traversed with a single conveyor system using relatively low tension rating external carry and/or internal drive belts. The conveyor systems may also eliminate belt-to-belt transfer equipment, which are often used in multi-conveyor systems.

Figure 4:
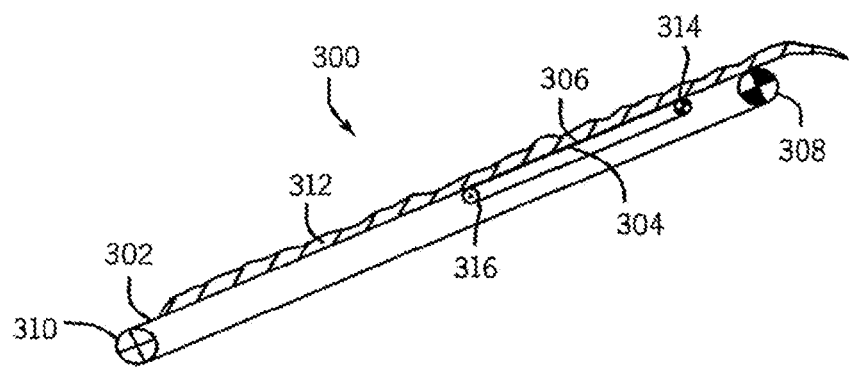
FIG. 4 shows a schematic elevation view of a first example of a conveyor system according to various embodiments.
Figure 5:
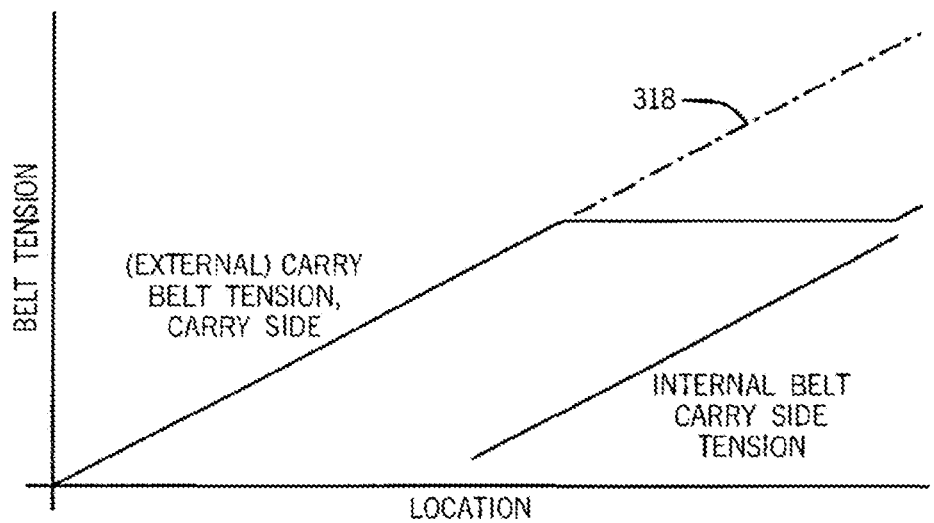
FIG. 5 shows a graphic representation of tension for the external belt and tension for the internal belt of the conveyor system shown in FIG. 4.

With reference to FIGS. 4 and 5, a first embodiment of the conveyor system 300 is described. Almost the entire length of the conveyor system 300 may run on a substantial incline for transporting materials from one location to a different location, such as from a lower level location to a higher level location. The conveyor system 300 may include an external belt 302 and an internal belt 304. The internal belt 304 may be selectively positioned over a portion of the length of the external belt 302 and inside the continuous loop formed by the external belt 302. In some examples, the internal belt 304 may be configured to traverse approximately an upper half of the incline. At a contacting interface 306 between an underside of the external belt 302 and the carry side of the internal belt 304, frictional shear between the two surfaces may be utilized to transfer tension from one belt into another.

The external belt 302 may include a head pulley 308 and a tail pulley 310. The head pulley 308, located proximate to the higher level location, may be powered, and thus may serve as the drive pulley. The tail pulley 310, located proximate to the lower level location, may or may not be powered. The head pulley 308 and the tail pulley 310 may be configured to move/rotate the external belt 302 to carry materials 312 from the lower level location to the high level location. As such, the external belt 302 may also be referred to as the carry belt 302.

The internal belt 304 may include an internal belt head pulley 314, which may be powered to serve as the drive pulley, and an internal belt tail pulley 316, which may or may not be powered. Unlike the external belt 302 that may run the entire run of the conveyor system 300, the internal belt 304 may be selectively positioned to extend from approximately the mid-point of the run of the conveyor system 300 to an end of the conveyor system 300 proximate to the higher level location. Accordingly, the internal belt tail pulley 316 may be positioned proximate to the mid-point of the run of the conveyor system 300, and the internal belt head pulley 314 may be positioned proximate to the second location and in relatively close proximity to the head pulley 308 of the external belt 302. The conveyor system 300 may be configured in a manner such that during operation, the upper side of the internal belt 304 may be configured to transition from a substantially flat configuration to a substantially fully troughed configuration at the tail of the internal belt 304 to operably engage the underside of the external belt 302. The upper side of the internal belt 304 may be further configured to transition from the substantially fully troughed configuration to the substantially flat configuration at the head of the internal belt 304 to operably disengage the underside of the external belt 302. When the internal belt 304 engages the external belt 302, the internal belt 304 may frictionally drive the external belt 302 and relieve the head pulley 308 of a significant portion of the tension that the load material 312 may impart to the external belt 302. As such, the internal belt 304 may also be referred to as the friction drive belt 304.

Figure 1:
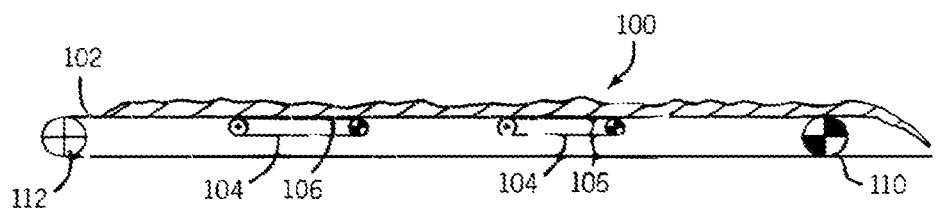
FIG. 1 shows a schematic elevation view of a belt-on-belt conveyor system.
Figure 2:
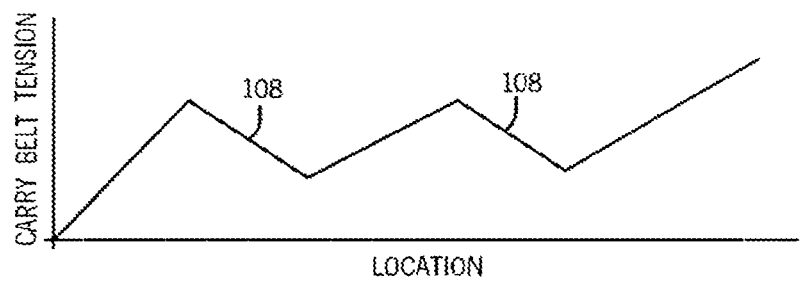
FIG. 2 shows a graphic representation of tension for the carry belt of the conveyor system shown in FIG. 1.
Figure 3:
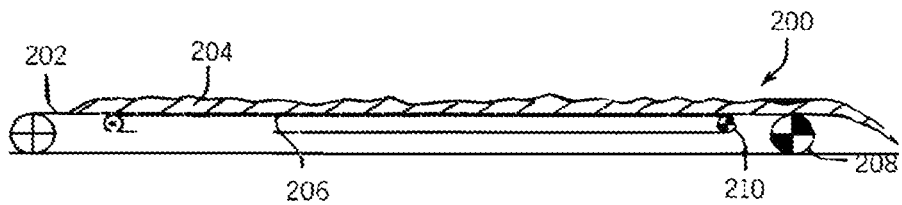
FIG. 3 shows a schematic elevation view of another belt-on-belt conveyor system.

To achieve the friction-drive and tension relief function, in some examples, the internal belt 304 may be configured to approximately match the external belt 302 in both its width and in its tensile capacity per unit width. Moreover, both the external belt 302 and the internal belt 304 may have substantial longitudinal strength, so that each may share a pre-determined portion of the tension developed over the length of the entire route. In some examples, the external belt 302 and the internal belt 304 may have substantially similar allowable tension ratings. In some examples, both the external and internal belts 302, 304 may be high-strength steel-cord or steel cable belts. This is in contrast to the internal drive belt 206 shown in FIG. 3, where the internal belt 206 is configured to be the primary tension-carrying element over most or all of the conveyor length and the external belt 202 is configured as a low-cost, low-strength consumable belt. This is also in contrast to the short belt-on-belt drives shown in FIG. 1 where the internal belt 106, though as wide as the external belt 102, is often a fabric-carcass belt with sufficient flexibility to allow transition geometries that are not possible with steel-cord belts.

In some examples, the drive or (set of drives) for the internal belt 304 may be further configured to provide a similar amount of power as provided by the drive (or drive set) of the external belt 302. In some examples, when the entire length of the conveyor system 300 is carrying its nominal design load, the maximum steady-state tension in the internal belt 304 may be configured to approximate the maximum steady-state tension developed in the external belt 302, as shown in FIG. 5.

Additional methods and/or mechanisms may be implemented (1) to prevent slack belt accumulating between the drive pulley 314 of the internal belt 304 and the drive pulley 308 of the external belt 302, and (2) to facilitate transitioning and mating between the internal and external belts 302, 304.

To prevent slack belt accumulating forward of the drive pulley 314 of the internal belt 304, especially for steep conveyors, in some examples, closely-spaced carry idlers may be provided in the segment between the head pulley 314 of the internal belt 304 and the head pulley 308 of the external belt 302 to give improved support to any slack belt that does arise. In some examples, a variable-frequency drive ("VFD") control system may be used to keep the speeds of the drive pulleys 308, 314 for the internal and external belts 302, 304 sufficiently close to each other. However, even without closely-spaced carry idlers or VFD control system, the risk of the booster drive pushing slack belt ahead of it and causing excessive sag may be negligible by locating the drive pulley 314 of the internal belt 304 close to the head pulley 308 of the external belt 302. This is because the short distance set between the internal belt head pulley 314 and the external belt head pulley 308 may facilitate drawing the external belt 302 over the external belt head pulley 308 before too much "pushed forward" belt accumulates between the head pulleys 308, 314. In addition, the return portion of the external belt 302 lying on the downhill slope may also provide a constant and substantial tension for the external drive pulley 308 in the downhill direction, thus tending to accelerate the pulley 308 if tension in the uphill direction drops, thus pulling the "extra" belt, if any, through.

To provide a transition or a transition length for the inner belt from its flattened profile at a tail pulley of the inner belt to the troughed profile in contact with and supporting the troughed external belt, several mechanisms may be implemented. In some examples, such mechanisms may be required to allow gradual transitions of the external and/or internal belts between a flattened profile and a troughed profile when both the external and internal conveyor belts may be high-strength steel-cord belts. Such mechanisms may also provide sufficient support for the central and lateral portions of the troughed external belt to contain the carried material in a troughed belt, even while the internal belt is brought into contact with the underside of the external belt. Similar mechanisms may also be provided near the head pulley of the internal belt, where separation of the two belts may be facilitated.

Figure 6A:
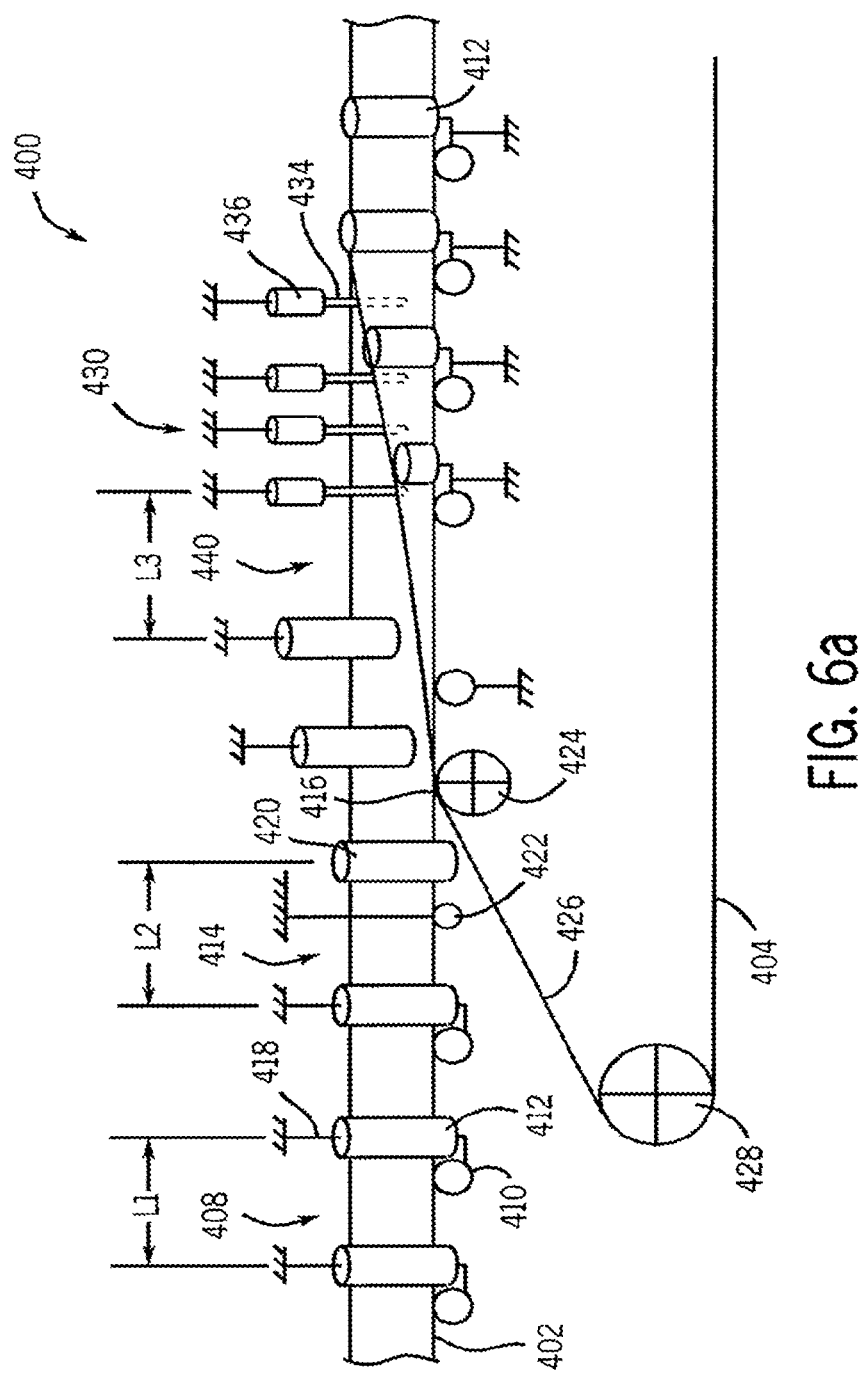
FIGS. 6a, 6b, 6c, 6c', 6d, 6d', 6e, and 6f illustrate a first example of a configuration that may facilitate engagement and disengagement of an external belt and an internal belt of the conveyor systems as described herein.
Figure 6B:
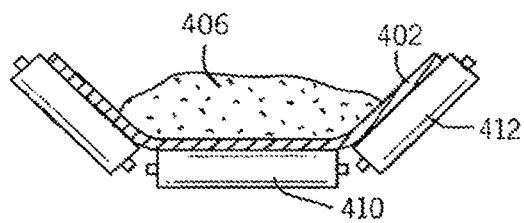
Figure 6C:
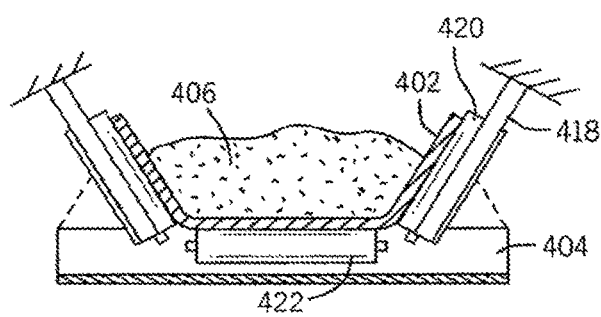
Figure 6C:
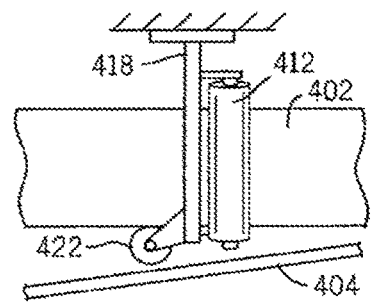

With reference to FIGS. 6a, 6b, 6c, 6c', 6d, 6d', 6e and 6f, a first example of a configuration that may facilitate the engagement and disengagement of the external and the internal belts with each other is described. FIG. 6a shows a lateral elevation view of a transition portion of a conveyor system 400 where the trough of the external belt 402 may descend onto the trough of the internal belt 404 so that the external belt 402 and the internal belt 404 may engage each other. FIGS. 6b, 6c, 6d, and 6e show transverse section views of the conveyor system 400 at different locations along the transition portion. It will be appreciated by those skilled in the art that a similar arrangement may be provided in another transition portion of the conveyor system 400 where the external belt 402 and the internal belt 404 may disengage each other.

FIG. 6b shows a transverse section of the external belt 402 carrying a material load 406 at a location upstream of the transition region (the internal belt 404 is omitted from this view). At this location, the external belt 402 may be supported by a set of carry idlers. The set of carry idlers may be a set of standard idlers that may include a central idler 410 and at least two wing or lateral idlers 412. The wing idlers 412 may support the trough at a first angle, such as a standard troughing angle, for the carry side of the conveyor 400.

FIG. 6c shows a transverse section of the external belt 402 and the converging internal belt 404 at a location 414 as they approach the point 416 (FIG. 6a) where the two belts 402, 404 will come into contact. FIG. 6c' is a lateral elevation of the same idler station, showing a short length of the assembly. Leading up to this idler station, the wing idlers 412 may be configured to carry the external belt 402 in a steeper trough than at the preceding standard idler stations. In some examples, the wing idlers 412 may be mounted to brackets 418 that may be supported from above. Mounting the wing idlers 412 to the brackets 418 supported from above may facilitate the still-flattened internal belt 404 converging on the underside of the external belt 402. In addition, the wing idlers 420 used at this station may be of a smaller running surface diameter than those employed at a standard idler station. Furthermore, in order to allow convergence between the two belts 402, 404 while still providing vertical support for the external belt 402 and its load 406, the central idler 422 of each idler set in this area may be configured to have a smaller running surface diameter than that used in standard central idlers 410.

Figure 6D:
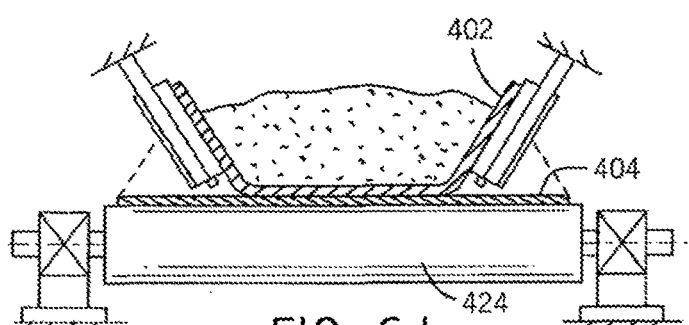
Figure 6D:
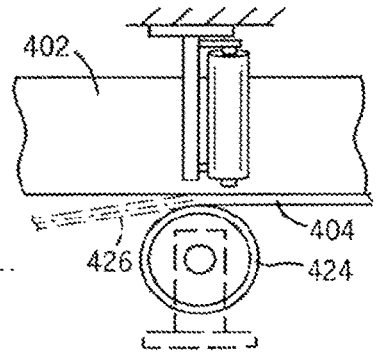

FIG. 6d shows, in transverse section, a station at the point 416 where the still-flattened internal belt 404 has been brought up to mate with the underside of the external belt 402. The internal belt 404 at this station may be deflected and supported by a bend pulley 424. In FIG. 6d', the path 426 of the internal belt 404 in coming off its tail pulley 428 is illustrated by the dashed outline.

Figure 6E:
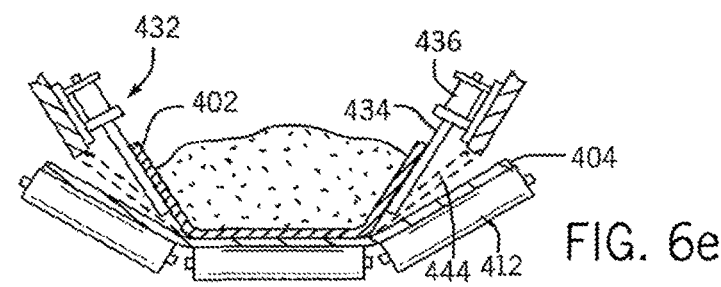

FIG. 6e shows an idler station at a location 430 (FIG. 6a) yet further along the transition portion, where now the lateral portions of the external belt 402 may be supported by small-diameter wing idlers 432, and the lateral portions of the internal belt 404 may be carried closer to the mating position by wing idlers 412, which may be standard-diameter idlers. Each of the small-diameter wing idlers 432 may include a belt-supporting idler cylinder 434. The belt-supporting idler cylinder 434 may have a very much smaller diameter than a standard idler. In order to allow a close convergence of the lateral portions of the internal belt 404, the idler cylinder 434 may be cantilevered from a mounting boss assembly 436, which may in turn be supported from an overhead bracket. To help ensure that the small-diameter idlers 432 have enough strength for their duty, such idlers may be closely spaced to reduce the load on any individual idler cylinder 434. In some examples, a longer idler spacing may be allowed at some points in the transition/mating segment. Additional local design details may be implemented to address any potential issues otherwise associated with longer idler spacing.

Figure 6F:
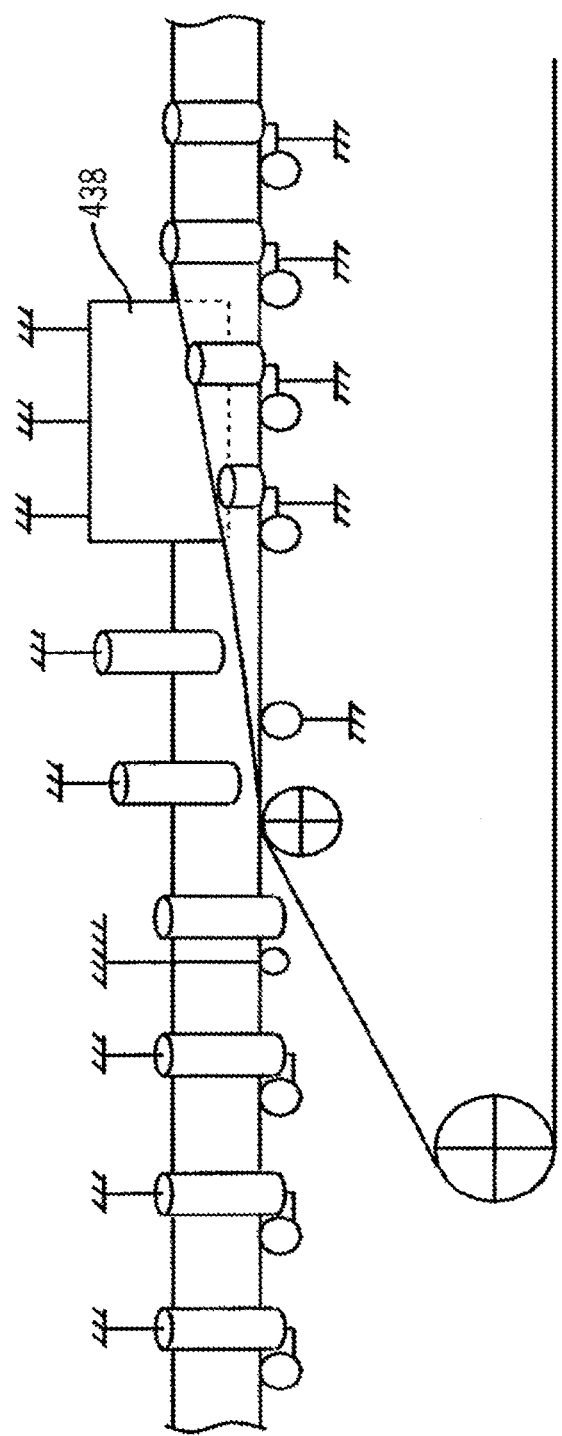

In order to reduce impact loads on the cantilevered idler cylinder 434, the idler boss assembly 436 may be provided with a resilient suspension mechanism that may allow the idler cylinder 434 to deflect out of the path of protrusions from the under-surface of the external belt 402. With reference to FIG. 6f, an air-slider panel or a slider pad 438 may be used to support the lateral walls of the external belt 402 where the lateral walls of the two belts are converging on each other, and the lateral space for the belt supporting mechanism may be limited. The air-slider panel or slider pad 438 may also minimize local belt sag.

FIG. 6e also shows by the dashed lines the ultimate trough profile 444 of the external belt 402 when the lateral portions of the external belt 402 and internal belt 404 are mated and the external belt 402 may return to its standard troughing angle. From this it may be seen that—for both the external belt 402 and the internal belt 404—only a relatively small amount of change in the angles at which they are supported may remain to be effected before the lateral portions of the two belts 402, 404 are mated. Since the corresponding belt-length for the remaining transition may be relatively short, the lateral portions of the external belt 402 may hang unsupported by any wing idlers as the steepness of the carry trough is relaxed, until the point where they may be supported by the lateral portions of the converging internal belt 404.

With reference again to FIG. 6a, at the location 408 before the external belt 402 and the internal belt 404 may engage, the carry idler sets may be spaced at a predetermined distance L1 from each other. The distance L1 may be selected to optimize the economics and/or operation of the overall conveyor system. The distance L1 may be selected based on any other suitable consideration. In the transition region, it may be convenient to change the spacing between idler sets in order to facilitate the engagement of the external belt 402 and the internal belt 404. In some examples, at the location 414 where the external belt 402 and the internal belt 404 approach the point 416 where the two belts may come into contact and/or at the location 440 where the partially troughed lateral portions of the internal belt 404 further approaches the lateral portions of the external belt 402, the longitudinal spacing L2, L3 between the wing idlers may be greater than the longitudinal spacing L1 at location 408. Such greater spacing may allow sufficient space for the approach of the internal belt 404 towards the external belt 402 without idlers interfering in the narrowing space between the two belts.

Figure 7A:
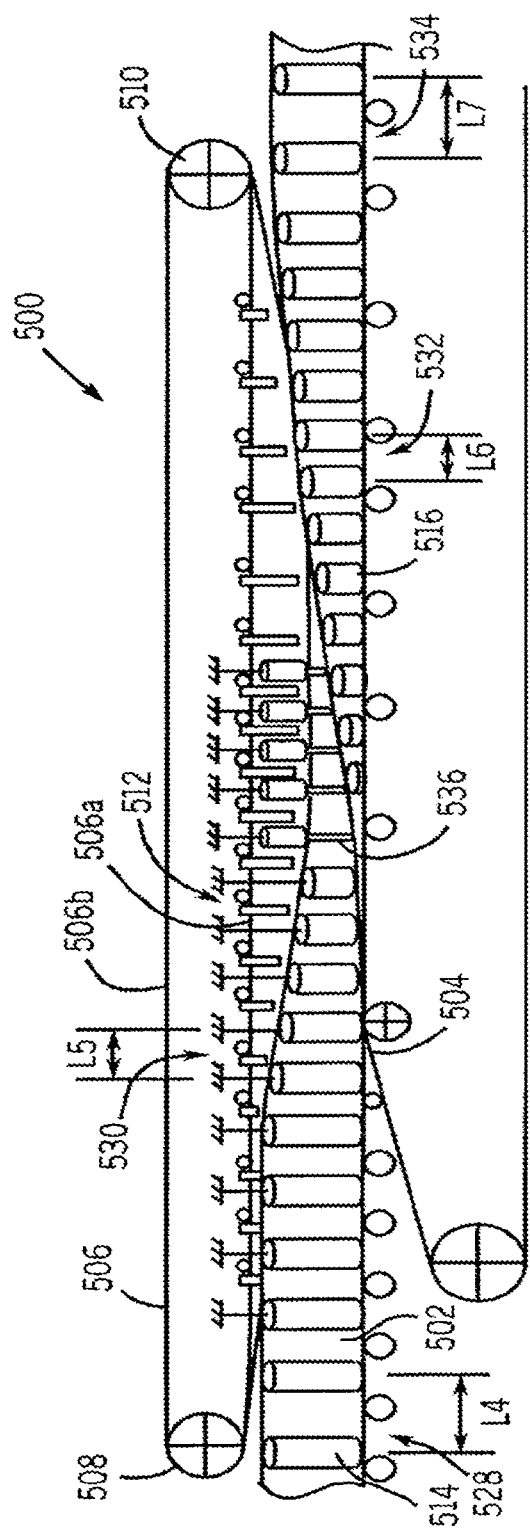
FIGS. 7a, 7b, 7c, 7d, and 7e illustrate a second example of a configuration that may facilitate engagement and disengagement of an external belt and an internal belt of the conveyor systems as described herein.
Figure 7B:
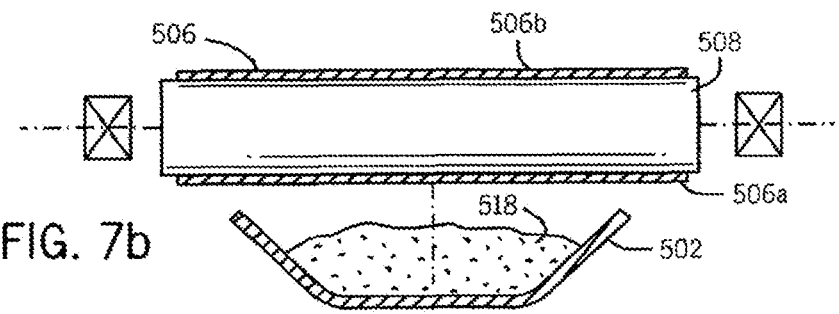
Figure 7C:
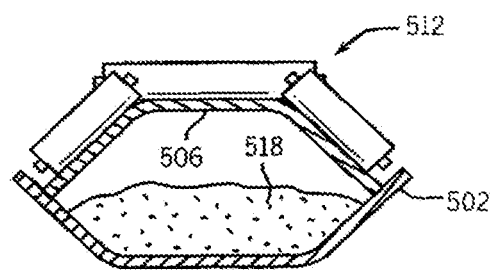
Figure 7D:
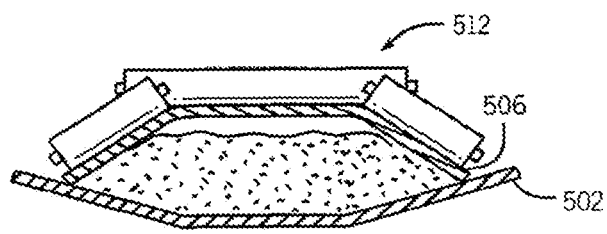

With reference to FIGS. 7a, 7b, 7c, 7d, and 7e, a second example of a configuration that may facilitate the engagement and disengagement of the external and the internal belts with each other is described. FIG. 7a shows a lateral elevation view of a transition portion of a conveyor system 500 where the external belt 502 and the internal belt 504 may engage each other. FIGS. 7b, 7c, and 7d show transverse section views of the conveyor system 500 at different locations along the transition portion. Note that the idlers supporting the underside of the external belt 502 and the converging internal belt 504 have been omitted from FIGS. 7b, 7c, and 7d.

With reference to FIG. 7a, an endless cover belt 506 may be used to contain the material carried on the external belt 502 so that the external belt 502 may be flattened in the transition region to be more easily mated with the internal belt 504. The cover belt 506 may be held in tension above the external belt 502 by a tail bend pulley 508 and a head bend pulley 510. The cover belt 506 may include a "carry" portion 506a facing the material load and a "return" portion 506b. The "carry" portion 506a may be guided by inverted idler sets 512 so as to form a constraining tunnel over the material carried by the external belt 502, while the trough of the external belt 502 may be guided into a shallower profile by its lateral idlers 514. The internal belt 504 may be guided by lateral idlers 516 into a partially-troughed form so as to engage the external belt 502 at a point where the internal and external belts 502, 504 are troughed to a similar degree. As the engaged pair proceeds further downstream, the lateral idlers 516 supporting the internal belt 504 may gradually return the pair of belts to the degree of troughing designed for the main length of the conveyor's run. During this transition, the inverted idler sets 512 may guide the cover belt 506 into a progressively steeper trough so as to continue to contain the material load carried on the external belt.

FIG. 7b shows a transverse sectional view of the external conveyor belt 502 carrying its load of material 518 at the location of the tail bend pulley 508 of the cover belt 506. The location of the tail bend pulley 508 may be at a predetermined distance upstream from the mating zone between the external belt 502 and the internal belt 504. At the head end of the cover belt 506, the head bend pulley 510 may be mounted above the external belt 502 in a similar manner to provide for the return of the cover belt 506. The cover belt 506 may be tensioned between its tail and head bend pulleys 508, 510 with an appropriate degree of tension to facilitate the forming an inverted trough of the cover belt 506. In some examples, the cover belt 506 may be driven by its contact with the external belt (described below) so that the tail and head bend pulleys 508, 510 of the cover belt 506 may be undriven pulleys.

FIG. 7c shows an idler station at a predetermined distance downstream from the station of FIG. 7b. At this station, the cover belt 506 may be deflected downwards and formed into an inverted trough by a series of idler sets 512, so that the edges of the cover belt 506 may rest against the exposed free edges of the carry surface of the external belt 502. The cover belt 506 may be constructed to allow a short transition zone between a bend pulley and a fully-troughed section of the cover belt 506. Therefore, a fabric belt with a nylon or equivalent carcass may be used. Any other suitable carcass may be contemplated. Also, the cover belt 506 may have sufficient transverse stiffness so that the cover belt 506 may support itself in an inverted trough when resting on its edges and appropriately guided by idlers 512 on its convex or outer surface.

FIG. 7d shows another idler station, yet further downstream from that of FIG. 7c. At this location, the idlers 514 supporting the external belt 502 may be transitioned to a configuration that may allow the trough of the external belt 502 to be shallower than before. At the same time, the idler sets 512 may be configured to guide the cover belt 506 in such a way as to maintain a contacting seal between the edge of the cover belt 506 and the surface of the external belt 502. As the trough of the external belt 502 has been made shallower, the lateral walls of the cover belt 506 may take over the duty of containing the material load and ensuring that the material load does not spill.

As the trough of the external belt 502 becomes flattened, it may become easier to transition the internal belt 504 to mate with the underside of the external belt 502, which may not require special idler configurations. Once the internal belt 504 and the external belt 502 are thus mated, the subsequent carry idler sets 516 may guide the mated internal and external belt pair back into the fully-troughed profile, while the cover belt idler sets 512 may allow the cover belt 506 to return to a tunnel form as shown in FIG. 7c, and thence released to become flattened for bending around the head bend pulley 510.

Further downstream from the head bend pulley 510 of the cover belt 506, the mated external and internal belts 502, 504 may continue their run with belts formed in the conveyor's standard trough, until the point where the internal and external belts 502, 504 may separate near the head of the conveyor 500. If the distance between the head pulley of the internal belt 504 and that of the external belt 502 is sufficiently large that continued lateral containment of the carried material must be maintained, then a cover belt arrangement similar to the cover belt 506 described above may be installed at the head end of the conveyor system 500. In that position, the cover belt may be applied to contain the material on the external belt 502 while the external belt 502 may be flattened to facilitate separation of the external belt 502 and the internal belt 504. The cover belt may then further contain the material until the external belt may be re-troughed for the remainder of its run to its head pulley.

The series of idler sets 512 for guiding the cover belt 506 may be configured with a close longitudinal spacing in order to properly form and guide the cover belt 506. In the zone where the edges of the cover belt 506 must contain the carried material 518, a series of idler sets supporting the external belt 502 may also be configured with a close longitudinal spacing, in order to minimize the belt sag between idlers and therefore minimize any gap between the edge of the cover belt 506 and the surface of the external belt 502. In some examples, as an alternative to close idler spacing, slider pads may be used to minimize local sag. In some examples, the cover belt 506 may be configured with structures that may help to ensure a good seal or contact between the cover belt 506 and the external belt 502.

Figure 7E:
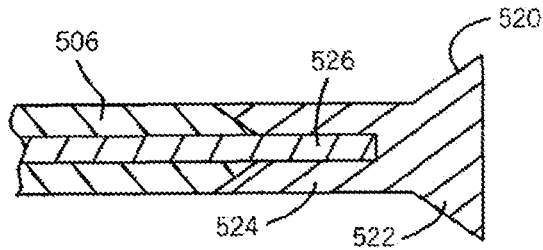

FIG. 7e shows a transverse sectional view of an edge portion of the cover belt 506. An edge member 520, such as a seal or contact member, may be provided along a portion, or an entirety, of each of the two longitudinal edges of the cover belt 506. The edge member 520 may include a foot portion 522 and an attachment portion 524 for joining the foot portion 522 to the cover belt 506. The attachment portion 524 may be joined to the main carcass of the cover belt 506 by a lap joint or any other suitable attachment method. In some examples, the attachment portion 524 may have a C or reverse C shape cross section. The thickness of the attachment portion 524 (i.e., the height of the C or reverse C shape cross section) may be configured to be substantially the same as or similar to the thickness of the cover belt 506. The open end of the C or reverse C shape of the attachment portion 524 may be configured to receive a portion of the main carcass 526 of the cover belt 506 and joined thereto by adhesive, gluing, or any suitable method. The foot portion 522 of the edge member 520 may have a dovetail cross section with the narrower side joined to the attachment portion 524 and the wider portion forming a greater contact surface with the external belt 502. The attachment portion 524 and/or the foot portion 522 may have any other suitable cross section shapes.

The edge member 520 may be formed from a relatively soft elastomer or similar material, so as to conform to any irregularities in the surface against which it may rest and to ensure a good seal or contact therebetween. The edge member 520 may be further configured to have sufficient flexibility to allow the contacting surface of the foot portion 522 to remain pressed against the surface of the external belt 502, even when each lateral portion of the cover belt 506 may not be held perpendicularly to the plane of each edge land of the external belt 502. This flexibility may also allow the foot portion 522 to be deflected without damage when the cover belt 506 may pass around a bend pulley.

With reference again to FIG. 7a, at a typical location 528 upstream of the mating area, the carry idler sets 514 may be spaced at a predetermined distance L4 from each other. The distance L4 may be selected to optimize the economics and/or operation of the overall conveyor system. The distance L4 may be selected based on any other suitable consideration. In the mating region, to facilitate a close engagement of the edge of the cover belt 506 and the surface of the external belt 502, it may be desirable to reduce the spacing between lateral idler sets 514 in order to prevent undulation of the walls of the external belt 502. For example, at location 530 and location 532 shown in FIG. 7a where the edges of the cover belt 506 must contain the material load, the respective longitudinal spacing L5, L6 between the wing idlers may be smaller than the longitudinal spacing L4 at location 528 or the longitudinal spacing L7 at location 534. In order to further support the external belt 502 without significant undulations in the area where the lateral walls of the internal and external belts 502, 504 are closely approaching each other, idlers with cantilevered small-diameter running cylinders 536 may be installed. Similar to the idler cylinders as described with respect to the example shown in FIG. 6a, the small-diameter running cylinders 536 may be conveniently supported from above.

For the conveyor systems as described herein, a longer transition length may be implemented to allow the rates of transition of the external and/or internal belts in the mating segment to be very gentle. This is because increased transition length may not increase the overall length of the conveyor system as described herein. In other words, at the transition there may be little penalty for a longer transition length. This is in contrast to the case of a conventional transition at the head or tail of a conveyor, where the transition length is usually kept as short as possible in order to minimize the overall length of the conveyor.

There are many advantages of the conveyor systems described herein. First, there is negligible risk of the internal belt pushing slack belt ahead of it and causing excessive sag due to the proximity between the drive pulleys. Additionally, the conveyor belt system overcomes the power consumption limitation regarding the belt-on-belt conveyor shown in FIG. 1 (i.e., the industry rule of thumb of one horsepower of power transfer per longitudinal foot regarding the power that can be input to the carry belt by a belt-on-belt drives) because under most full-load conditions, there is sufficient interfacial friction available to transfer the incremental load from the carry belt to the booster belt. Furthermore, design of the load transfer between the external belt and the internal belt may rely on much higher coefficients of friction than can be assumed in the short booster drives of FIG. 1. This is because the great length of contact between the two belts allows load shedding from segments that may be wet and slippery to lengths with higher-than-average coefficients of friction.

Moreover, the internal belt may be advantageously implemented in such a way that the internal belt may be only called upon to take on the tension increments due to gravity acting on that portion of the external belt and the material load directly above each incremental length of the internal belt (i.e., the tension component 318 of FIG. 5). In some examples, at the portion of the external belt driven by the internal belt, most, if not all, of the tension required to carry the material load and the weight of the external belt on the slope, and a portion of the main frictional resistance accrued by the external belt in riding on the internal belt, may be transferred to and accrued by the internal belt. In some examples, at least one of the external belt or the internal belt may be configured to carry between a third and a half of the total conveyor tension accrued over the course of the slope. This is in contrast to the booster belts 106 shown in FIG. 1, which are relatively short and configured to primarily relieve tension developed elsewhere along the route of the external belt 102. For the conveyor systems as described herein, at the portion of the external belt driven by the internal belt, the rate of tension rise in the external belt may be approximately zero or a modestly higher rate. As such, the strength requirement for the external belt may be reduced.

By using the term "modestly higher rate," it is not intended to limit the rate of tension rise in the external belt to be a specific range. Rather, because the configuration of the conveyor systems as described herein advantageously allows tension transfer from the external belt to the internal belt over the course of slope, it may allow the rate of tension to be any suitable range. In some examples, the internal belt may be configured to accrue the share of the load that may result in no tension increase in the external belt as it is carried on the internal belt. In some examples, the load-share between the external belt and the internal belt may be configured to allow the tension in the external belt to continue rising at some rate less than it would have without the internal belt. Such conveyor systems may still be economically and operationally attractive compared to conveyor systems without an internal belt.

In addition to tension reduction and run length increase, the configuration of the conveyor systems also overcome issues associated with creep between the external and internal belts due to differential elongation, which is problematic for conventional belt-on-belt drives. This is because the steel-cord belts used in the conveyor systems are much stiffer than the fabric belts traditionally used in belt-on-belt drives. As such, for the same tension differentials, there is much less differential elongation between the internal and external belts of the conveyor systems. Calculations suggest that over a 1-mile length of friction-belt drive, the differential elongation between the steel-cord carry belt and a friction belt of the same strength is only of the order of half a foot for ST4500 belts. In addition, the interface between the two belts is relatively clean, thus minimizing the amount of wear that might result from creep. Moreover, the dynamic movement of the belts over the idlers may continuously provide opportunities for local release between the two surfaces.

Figure 8:
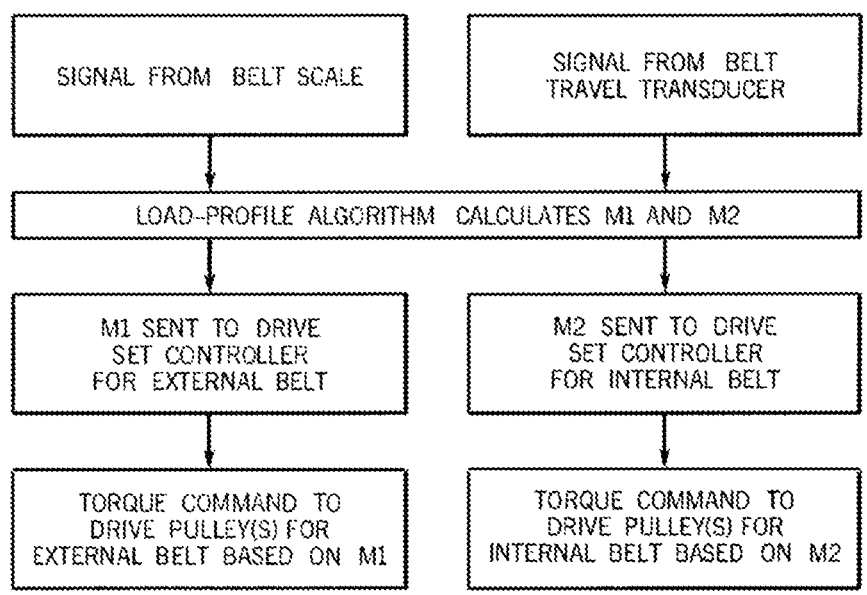
FIG. 8 is a flow diagram illustrating a control method for the conveyor systems described herein.
Figure 9:
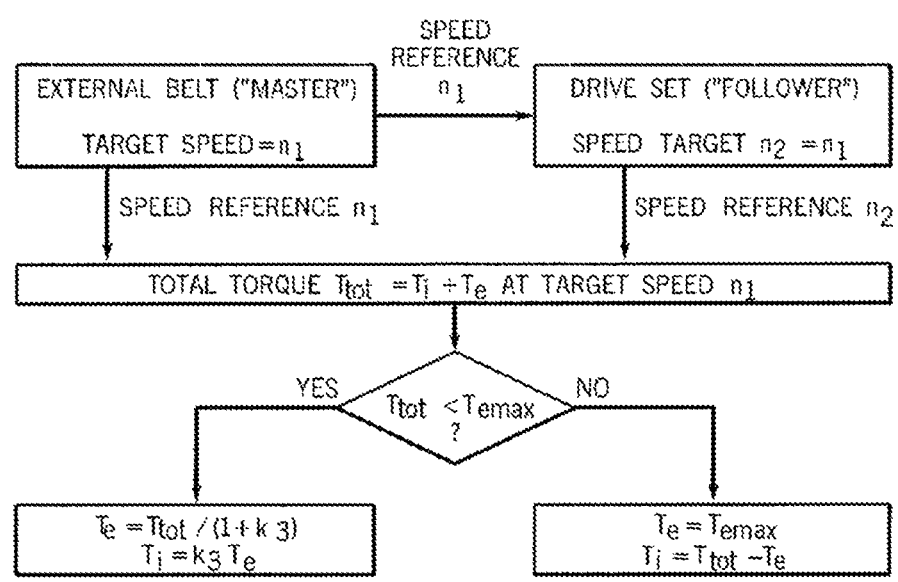
FIG. 9 is a flow diagram illustration another control method for the conveyor systems described herein.

With reference to FIGS. 8 and 9, the method or configuration for achieving proper load-sharing between the external belt (i.e., the carry belt) and the internal belt (i.e., the booster belt) and for achieving correct progression of each belt will now be described.

In some examples, the conveyor systems as described herein may include a belt-scale provided near the tail of the external belt just downstream of the loading point to continuously measure the weight of material passing over it. The conveyor system may also include a belt travel transducer provided adjacent to the belt scale. With reference to FIG. 8, signals from the belt scale and the belt travel transducer may be sent to a control system for controlling the load-sharing between the internal and external belts and/or for controlling the progression of each belt. The control system may include a load-profile component configured with a load-profile algorithm. The load-profile algorithm may be configured to continuously calculate total mass M1 on the portion of the external belt not resting on the internal belt and total mass M2 on the portion of the external belt resting on the internal belt to continuously update a profile of the total weight of material on each distinctly-configured length of the conveyor. For example, the external belt could be broken up into lengths based on the locations of the belt-on-belt drives.

The control system may further include a drive set controller for the drive pulley(s) of the internal and a drive set controller for the drive pulley(s) for the external belts. Each drive set controller may use the load profile to allocate the torque supplied to each drive pulley in proportion to how the material load (and therefore the capacity for tension transfer) is distributed. In some examples, the calculated total mass M1 may be sent to a drive set controller for the drive pulley(s) of the external belt. The calculated total mass M2 may be sent to a drive set controller for the drive pulley(s) of the internal belt. The respective drive controllers may then calculate the torque for each of the drive pulleys based on the total mass M1 and/or M2 received. In some examples, the respective torques may be calculated based on the following equations:

$$T_e = c_1 + k_1 M_1,$$

$$T_i = c_2 + k_2 M_2,$$

where $T_e$ is the torque delivered by the drive pulley(s) for the external belt, and $T_i$ is the torque delivered by the drive pulley(s) for the internal belt. The equation coefficients $c_1$, $k_1$, $c_2$ and $k_2$ may be determined according to the requirements of the conveyor system. In some examples, the coefficients may themselves be variable functions.

In addition to the drive sets being partially controlled so that the friction capacity of the belt-on-belt interface may not be exceed to avoid slip between the internal and external belts, by means of the torque signals as described above, the drive set control may also be elaborated by additional inputs including such variables as target and actual belt speed, among other variables used in the control disciplines.

In some examples, the primary drive pulley of the external belt may be configured as the master for both torque and speed, and the internal belt primary drive pulley may be configured as the follower to match the speed of the master pulley. A control philosophy may be adopted to designate the master drive (or drive set) to take the first share of the load, with the second share of the load being taken up by the internal belt's drive (or drive set) as needed. The master pulley may be configured to drive the external belt until a target speed $n_1$ is attained, and the follower drive pulley may be controlled to drive the internal belt to match the speed of the master pulley, adjusted as necessary for any belt tension differential. The master drive pulley may be controlled to ramp up to its nominal full-load continuous torque $T_{emax}$ (i.e., the torque required for the master drive to carry its share of the full load without assistance from the booster drive). The follower drive pulley may be controlled to follow the master's torque according to the following rules.

With reference to FIG. 9, when the total torque $T_{tot}$ required to drive the belt system at the target speed $n_1$, manifested by incrementally injecting torque until the speed target $n_1$ is attained, is smaller than the nominal full-load continuous torque $T_{emax}$ of the master drive pulley, the follower pulley may be configured to apply at least a minimum percentage $k_3$ (such as 15%) of the torque that the master pulley is applying. When the total torque $T_{tot}$ required to drive the belt system at the target speed $n_1$ is greater than the nominal full-load continuous torque $T_{emax}$ of the master drive pulley, as the master drive pulley ramps up to its nominal full-load continuous torque $T_{emax}$, the follower pulley may be configured to apply at least the minimum percentage $k_3$ of the torque that the master pulley is applying; once the master pulley has ramped up to its nominal continuous full-load torque $T_{emax}$, torque may be added to the follower pulley to the extent necessary to achieve/maintain the target speed $n_1$ for that instant. The maximum torque for the follower drives may be set at a level which is sufficient—without help from the master drives—to carry a full load of material over the boosted length, plus the weight of the external belt over the internal belt, plus all related frictional loads.

Unloading of the conveyor, short of manual unloading, in case of failure of either the master or follower drive set will now be discussed.

If the follower drive fails while the entire belt is fully loaded, the external belt may need to carry twice the rated tension if the internal belt extends over the upper half of the conveyor's length. Since the external belt is configured to have a static factor of safety of at least 2.5 against tensile failure of the belt or splice, there is enough available belt strength to safely unload the conveyor. However, the unloading may be gradually done at a reduced speed to allow for the master drive to have sufficient torque and cooling to creep the belt upwards for at least short periods. For the case where the internal belt spans approximately half the length of the conveyor, the master drive may need to run slowly and apply about twice the nominal torque that is applied when both the master drive and the follower drive are operating normally.

If the master drive fails when the belt is fully loaded, the effective average coefficient of friction between the external and internal belts may still, or even be very likely to, have sufficient capacity to prevent the internal belt from slipping against the external belt, even when twice the nominal working tension is being transferred into the internal belt. Similar to the static factor of safety for the external belt, the internal belt is also configured to have enough static capacity to safely support the extra load. As such, for short periods, the follower drive is configured to have the capacity to exert twice its nominal full load torque to allow the conveyor to be emptied as discussed above with respect to the master drive in case of the follower drive's failure.

If the master drive fails when the lower half of the conveyor is fully loaded, but the upper half of the conveyor is unloaded, there may or may not be enough traction available between the external belt and the internal belt to drive the external belt further up the slope to unload the conveyor. In case there may not be enough traction available between the external belt and the internal belt to drive the external belt further up the slope to unload the conveyor, after the conveyor system has come to a stop and is held by the backstops, the conveyor system may be configured with mechanisms upstream of the follower drive to temporarily impose sufficient vertical load on a predetermined upper-most segment of the belt-on-belt portion of the conveyor system.

The length of such a temporarily-loaded section may depend on one or more of the following: the strength of the carry idlers, the spacing of the carry idlers, and/or the amount of load per unit length that can conveniently be superimposed. For example, for typical values of belt-to-belt friction and slope conveyor slope angle, the actual coefficient of friction between the internal and external belts would be about six times higher than the minimum coefficient of friction needed to prevent slipping during normal operation. This friction reserve may be exploited in the event of the emergency described above. Then, if the superimposed load per unit length is configured to be five times higher than the nominal material load, the required length of the superimposed loading will be about one thirtieth of the length of the inner conveyor. So for an internal belt that is 1,500 m long from tail to head, a 50 m long segment of superimposed loading may be required. The location of the superimposed loading segment may need to be chosen with regard to the different load-distribution cases that might arise. For those sections of the conveyor that may be artificially loaded for the emergency described above, the carry idlers may be spaced sufficiently closely to adequately provide the reaction and "pinching" effect required.

Figure 10:
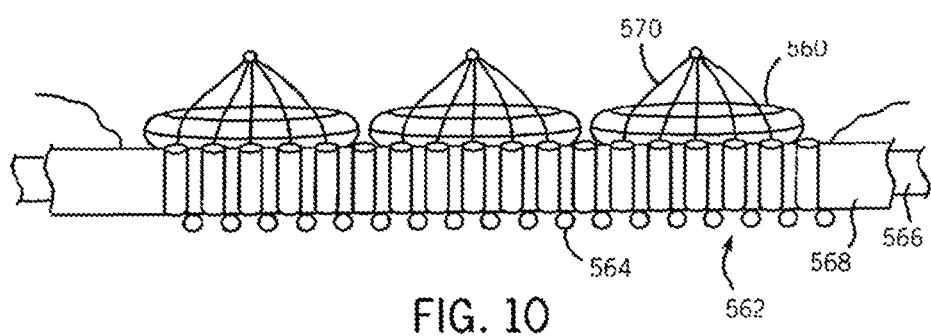
FIG. 10 shows a schematic elevation view of a load-superposition mechanism that may be used for the conveyor systems according to various embodiments.

With reference to FIG. 10, in some examples, the load-superposition mechanism may include a series of suitably-shaped large bladders 560. The series of suitably-shaped large bladders 560 may be placed end-to-end on the conveyor to provide load to the select portion 562 of the conveyor. In some examples, the bladders 560 may be filled by water through a water-hose to provide the required weight. In order to support the much higher load per linear length imposed by the weight of the bladders 560, the idlers 564 in this emergency-traction area 562 may be sized for the increased load, and may also be spaced more closely to each other than in typical lengths of the conveyor system. Such closer spacing serves to both distribute the intensified load over a larger number of idlers 564, and also to provide more contact points and a more extensive contact area (and therefore traction surface) between the inner surface of the external belt 566 and the outer surface of the internal belt 568. In some examples, the bladders 560 may preferably be contained in sling harnesses 570 to facilitate their removal from the conveyor as they arrive at a suitable unloading point. The load-superposition mechanism may further include structures for removing the bladders from the area as they are picked off the creeping conveyor. Once the load on the conveyor has been slowly advanced to the vicinity of the load-superposition mechanism, there will in most cases be enough load over the internal belt to allow all of the load-superposition mechanism to be lifted clear of the belt.

Figure 11:
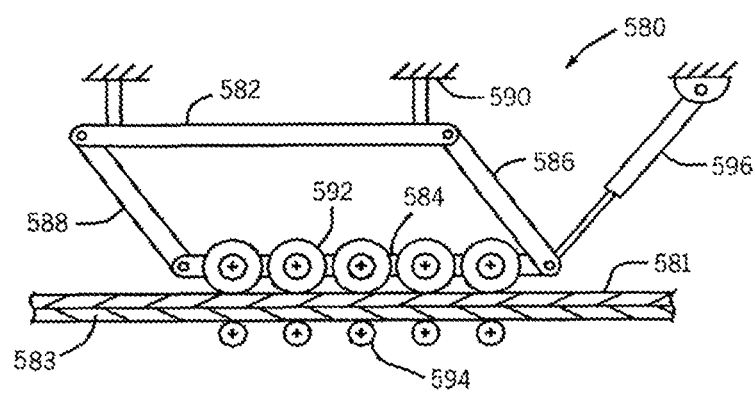
FIG. 11 shows a schematic elevation view of another load-superposition mechanism that may be used for the conveyor systems according to various embodiments.

With reference to FIG. 11, another example of the load-superposition mechanism will be described. The load-superposition mechanism may include one or more multi-wheeled load frames 580, which may be lowered from their storage locations above the conveyor onto the empty belt 581. In some examples, the load frame 580 may include four elongated members 582, 584, 586, 588 pivotally joined end-to-end to form a parallelogram. A first or upper elongated member 582 of the frame 580 may be operably joined to a structure 590, which may hold the first elongated member 582 at a predetermined distance above the conveyor system. A second or lower elongated member 584, parallel to the first elongated member 582 of the frame 580, may be configured with one or more load-superposition wheels 592. Each of the load-superposition wheels 592 may be vertically aligned with a carry idler 594 supporting the belts 581, 583.

The load-superposition mechanism 580 may further include an actuator 596. The actuator 596 may be operably associated with a third or side elongated member 586 joining two ends of the first and second elongated members 582, 584. Alternatively, the actuator 596 may be operably associated with the pivot joint of the second and third elongated members 584, 586. The actuator 596 may include an electric motor and a hydraulic cylinder or any suitable mechanical actuator configured to apply a pulling or push force on the multi-wheeled load frame 580. Because the four elongated members 582, 584, 586, 588 may pivot with respect to each other at their pivot joints, the forces applied by the actuator 596 on the third or side elongated member 586, or on the pivot joint, may be transferred to the wheels 592 through the second elongated member 584. When the actuator 596 applies a push force on the load frame 580, it may lower the load frame 580 onto the empty belt 581 and may further press the load frame 580 and the wheels 592 against the belt pair 581, 583 to apply the required load. The actuator 596 may further prevent vertical/lateral movement of the wheels 592 relative to the belt when engaged. When the actuator 596 applies a pulling force on the load frame 580, the load frame 580 may be removed from the conveyor system. In some examples, each load frame 580 may additionally and optionally carry a predetermined amount of ballast material to provide the necessary vertical load per unit length.

Yet in another different example of the load-superposition mechanism, multi-wheeled bogies may be lowered to a predetermined position above the external belt and held in position to prevent vertical movement with an arrangement similar to that of FIG. 11. Once in position, tires on the bogies may be inflated from a central system, thus developing the required vertical force on the belt pair. Each of the various examples of the load-superposition mechanisms may advantageously be used separately in some instances, or in combination in other instances.

With reference to FIGS. 12, 13, 14, and 15, second and third embodiments of the conveyor system will be described. In contrast to the first embodiment, where almost the entire length of the conveyor system may run substantially on an incline, the second and third embodiments may be configured to run over terrain where there may be a combination of one or more relatively flat sections and one or more steep sections. The steeply-sloping terrain, although it may be relatively short, may account for a large portion of the tension burden on the conveyor belt.

Figure 12:
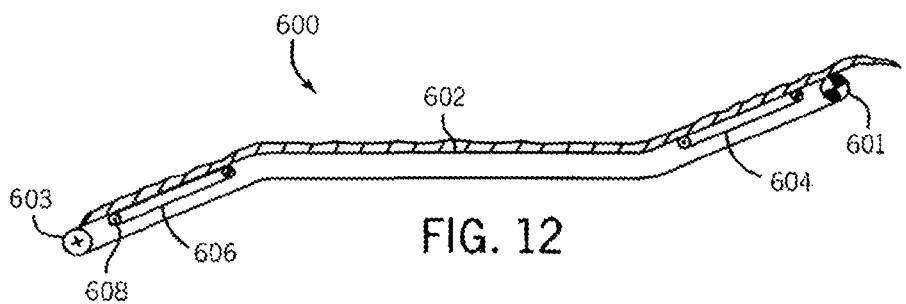
FIG. 12 shows a schematic elevation view of a second example of a conveyor system according to various embodiments.

With reference to FIG. 12, the topography of the second overland conveyor system 600 may be such that there is a steep section of the conveyor 600 adjacent to the head 601 of the conveyor 600 and/or a steep section of the conveyor 600 adjacent to the tail 603 of the conveyor 600. To reduce a tension burden on the carry belt 602, the conveyor system 600 may be configured with a belt-on-belt drive 604 with drive pulleys at the head 601 and/or a belt-on-belt drive 606 with drive pulleys at the tail 603. Locating the booster drives 604, 606 at the head 601 and/or the tail 603 offers the advantage of avoiding the expense of providing power and other infrastructure at locations remote from the terminal points of the conveyor 600. This configuration allows the much shorter booster belts to absorb most of the tension accrued over the conveyor's run, allows for the elimination of transfer points, and/or permits a lower-strength main belt to be used. In some examples, the maximum tension carried by each of the internal belts may be equal to or greater than the maximum tension carried by the external belt 602.

Figure 13:
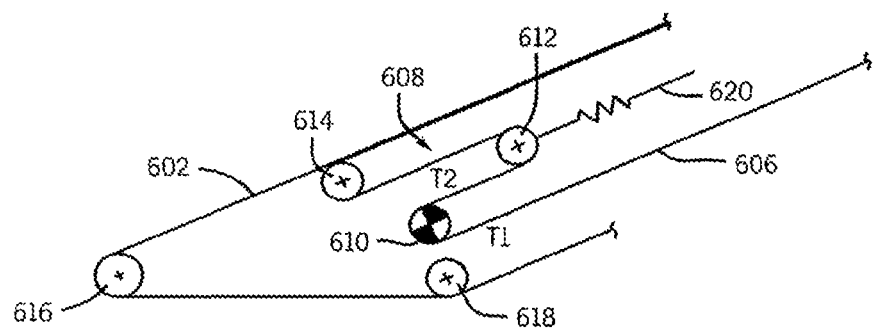
FIG. 13 shows a schematic elevation view of a tail-drive arrangement that may be used for the conveyor system shown in FIG. 8.

In some examples where an internal belt 606 may be driven from the tail 603, a tail-drive arrangement 608, as shown in FIG. 13, may be used in case where the route of that internal belt 606 does not have horizontal curves large enough to cause tracking problems on the "return" segment. In some examples, the tail-drive arrangement 608 may include a drive pulley 610, a take-up pulley 612, a tail pulley 614 operably associated with the internal friction-drive belt 606, and a tension mechanism 620, such as hydraulic, pneumatic, electrical or mechanical tension mechanisms, operably coupled to the take-up pulley 612. To accommodate the drive pulley 610, the take-up pulley 612, and the tail pulley 614 within the loop of the external carry belt 602, the conveyor system 600 may include two tail idlers 616, 618 operably associated with the external carry belt 602 at its tail 603 and spaced apart to create sufficient space for the tail-drive arrangement 608. The take-up pulley 612 and the tail pulley 614 may be configured downstream of the drive pulley 610 along the driving direction of the inner friction-drive belt 606 to accommodate changes in the length of the belt 606 since slack belt may be introduced by the drive pulley 610 downstream from the drive pulley 610.

Figure 14:
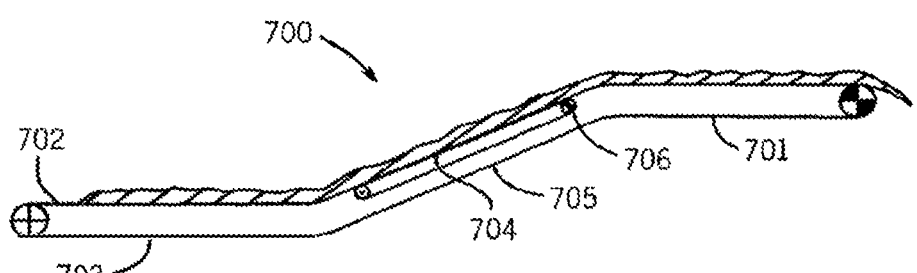
FIG. 14 shows a schematic elevation view of a third example of a conveyor system according to various embodiments.

With reference to FIG. 14, a third overland conveyor 700 will be described. The topography of the conveyor system 700 may include substantial relatively flat lengths 701, 703 and one or two relatively short but steep lengths 705 remote from terminal points of the conveyor system 700. The one or two relatively short but steep lengths 705 may, however, account for a high percentage of the tension load on the belt. As such, the conveyor system 700 may be configured with belt-on-belt drives on the steep lengths, allowing the much shorter booster belts to be configured to absorb most of the tension accrued over the carry belt's run. As such, the maximum tension carried by the internal belt 704 may be equal to or greater than the maximum tension carried by the long carry belt 702, which allows the long carry belt 702 to be of a much lower tension rating, and therefore less expensive.

In such cases, the amount of torque directed to the internal belt 704 may be controlled based on continuous measurement of the tension in the external belt 702. In some examples, the drive of the internal belt 704 may be at least partially controlled by reference to a tension measured in the external belt 702 just downstream of the head pulley drive 706 of the internal belt 704. This may be beneficial in the case where an internal belt originating at the tail of the overland conveyor may be positioned to pick up the tension due to a steep slope that begins near the tail and rises (or falls) for some distance before the overland conveyor reaches more gentle terrain.

For the conveyor system as described herein, the tension in the external belt may be measured without having to introduce a tripper pulley in the external belt. In some examples, the weight of material carried by the carry belt may be measured by a belt-scale at one location, the sag of the carry belt may be measured at a location adjacent to that of the belt scale, and the tension in the carry belt before or after the friction drive may then be calculated using the catenary formula, since all variables aside from the tension will be known. The predictions of the catenary formula may be adjusted as necessary to take account of the bending resistance of the open section constituted by the troughed belt. Any necessary adjustments may be determined by physical testing on a test rig, or by finite element analysis, or other suitable means. The belt speed may be used to provide a time lag in data sampling between the belt scale and the sag sensor so that the calculations may be performed with data representative of the material load on the particular belt segment for which the belt tension is being calculated. Other methods for continuously measuring the tension in the external belt without resorting to a tripper may be used.

Figure 15:
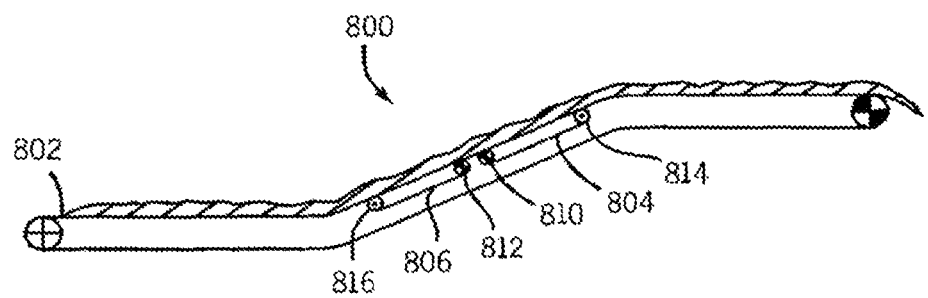
FIG. 15 shows a schematic elevation view of a fourth example of a conveyor system according to various embodiments.

In some examples, the demands of the sloped section may exceed the capacity of even the strongest available conveyor belts used in a friction-drive role. In such cases, a fourth embodiment of the conveyor system 800 as shown in FIG. 15 may be used to divide the slope duty among more than one belt-on-belt drives. With reference to FIG. 15, the topography of a fourth overland conveyor 800 may be such that there may be one steep length between two relatively flat lengths of the conveyor. The steep length may account for a high percentage of the tension load on the belt. The fourth conveyor system 800 may be configured with two friction-drive belts spanning the slope section to divide the slope duty. A first friction-drive belt 804 may be arranged at an upper portion of the slope section and a second friction-drive belt 806 may be arranged at a lower portion of the slope section. The first and second friction-drive belts 804, 806 may be configured in a back-to-back manner such that the tail 810 of the first friction-drive belt 804 may be in close proximity to, or abut, the head 812 of the second friction-drive belt 806. The tail pulley 810 of the first friction-drive belt 804 may be powered, and thus serve as the drive pulley, and the head pulley 814 of the first friction-drive belt 804 may or may not be powered. The first friction-drive belt 804 may further include a tail-drive arrangement similar to that shown in FIG. 13. The head pulley 812 of the second friction-drive belt 806 may be powered, and thus serve as the drive pulley, and the tail pulley 816 of the second friction-drive belt 806 may or may not be powered. One advantage of configuring the tail pulley 810 of the upper portion friction-drive belt 804 to be the drive pulley and configuring the head pulley 812 of the lower portion friction-drive belt 806 to be drive pulley is that service and maintenance for the drives of both friction-drive belts 804, 806 may be conducted in one location. However, the head pulley 814 of upper portion friction-drive belt 804 and/or the tail pulley 816 of the lower portion friction-drive belt 806 may be configured as drive pulleys for other considerations.

By using the arrangement shown in FIG. 15, a carry belt 802 with much lower tension rating may be used, without significantly increasing the cost, to traverse a much longer distance, which would otherwise require one or more carry belts with much higher tension rating and belt-to-belt transfer points. For example, the Los Pelambres conveyor system built in the late 1990's uses three conveyor flights to cope with the tensions generated in traversing the entire conveying route. Two of the three flights still use the strongest conveyor belts ever installed, at a rating of ST7800, and the third flight uses a belt at an ST4500 rating. Because three flights were required, the conveyor had to include two belt-to-belt transfer points and three drive locations. However, by using a conveyor system shown in FIG. 15, the entire conveying length from mine to stockpile could be traversed with one carry belt with an ST rating at about ST4500 and two back-to-back friction-drive belts at an ST rating at about ST7800 to handle the slope duty. A study shows that the total belt cost for this notional configuration would be about 12% higher than the as-installed belt cost. However, because the conveyor system shown in FIG. 15 reduces the number of locations for drive pulleys from three to two and eliminates the two belt-to-belt transfer points, the construction and maintenance cost for the conveyor system shown in FIG. 15 would be reduced compared to that of the as-built Los Pelambres conveyor system.

In cases where an outer or carry belt is driven by an inner or linear drive belt, the elongations in the carry and inner belts may be different over the span of the inner belt. To better understand these elongations, it is useful to first consider a short "booster drive" that is used in some applications, particularly in underground coal mines where both the carry belt and the booster belt are fabric belts. The common use of fabric belts in those kinds of applications is significant because fabric belts typically undergo elongations that are an order of magnitude higher than those found with steel-cord belts. Therefore, any detrimental phenomena relating to differential elongation between the carry belt and the inner belt should be far more apparent in conventional fabric belt linear drives than in those combinations described earlier, where the carry belt and/or the inner belt may be steel-cord belts.

Figure 16A:
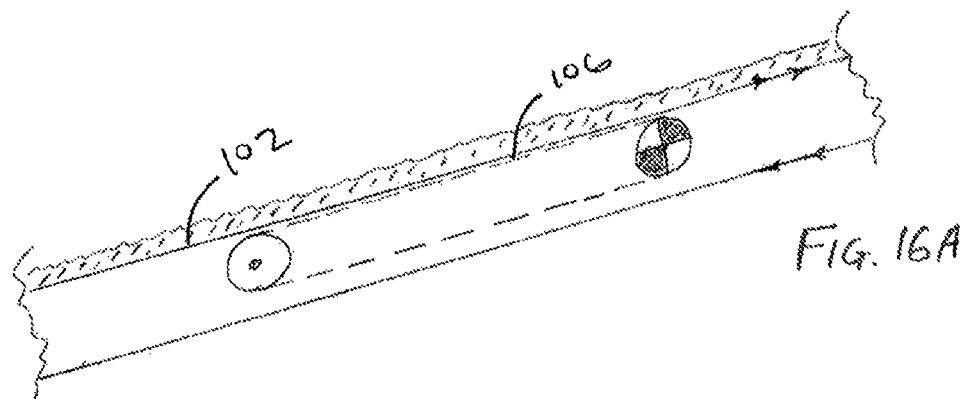
FIG. 16A illustrates a conveyor system with a portion of a carry belt (solid lines) supported and driven through a frictional interface by an inner belt (dashed lines) of a booster conveyor.

The "booster drive" depicted schematically in FIG. 16A illustrates a portion of a carry belt 102 (solid lines) supported and driven through a frictional interface by an inner belt 106 (dashed lines). For a carry belt 102 that might be kilometers long, center-to-center length of the inner belt 106 would typically be several tens of meters long. Research into the history of such equipment arrangements leads to the conclusion that—for configurations within accepted design rules—there is not a significant wear problem that occurs at the interface between the two belts 102, 106. Also, any problems relating to significant loss of power through wasted friction have not surfaced in the industry.

One of the "accepted design rules" relating to these arrangements is that this kind of linear drive cannot reliably inject more than one horsepower per foot of linear length into the carry belt 102. Therefore, to supply more tension or power to the carry belt 102, a designer must increase the length of the inner belt 106. It therefore follows that the linear drive transfers power along almost its entire length, and not just in that portion close to its head pulley. This latter behavior might be suggested by analyses that set the absence of relative creep between the two belts 102, 106 as a condition for the usefulness of internal drive belts that are perhaps a third to a half the length of the carry belt. The deduction that linear booster drives transfer a useful amount of friction along their entire length is important when one comes to consider how differential elongation of the carry and inner belts might affect tension transfer from the inner belt to the carry belt.

Figure 16B:
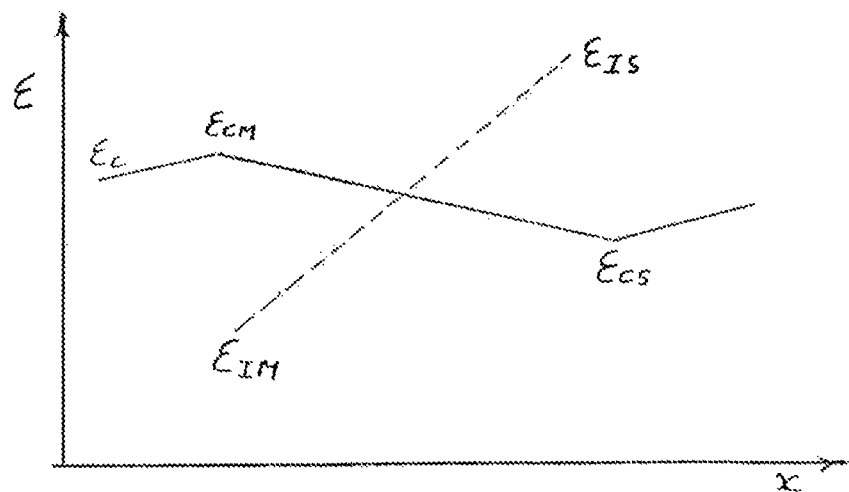
FIG. 16B is a graph that qualitatively illustrates how the elongation of the carry belt (Epsilon$_c$, solid line) changes in comparison the elongation of the inner belt (Epsilon$_I$, dashed line) over the boosted section of the conveyor.

FIG. 16B is a graph that qualitatively illustrates how the elongation of the carry belt 102 (Epsilon$_c$, solid line) changes in comparison the elongation of the inner belt 106 (Epsilon$_I$, dashed line) over the boosted section. In this figure and those that follow, Epsilon designates local strain or absolute level of elongation at a particular location along a belt, 102, 106; and V designates absolute local velocity at a particular location along a belt 102, 106. Also, in this figure and those that follow, the subscripts have meanings as follows: C designates a parameter of the carry belt 102; I designates a parameter of the inner belt 106; M designates the location where the two belts 102, 106 mate together; and S designates the location where the two belts 102, 106 separate from each other. The horizontal axes of the graphs, labeled "x", represent linear distance along the conveyor.

In the short booster drive of FIG. 16A, the effect of the booster or inner belt 106 is to reduce the tension in the carry belt 102. Therefore the tension in the carry belt 102 is lower at the point of separation from the booster drive than at the mating point. Since the tension is lower, the local magnitude of the strain in the belt 102 is therefore also lower at the separation point. The accumulation of diminishing strain between the mating and separation points causes the carry belt 102 to contract over the length of the booster. This contraction, in turn, means that the local velocity of the carry belt 102 also diminishes over the length of the booster. This velocity reduction is illustrated in FIG. 16C as the solid line between the points $V_{CM}$ and $V_{CS}$.

Considering now the behavior of the inner belt 106 in FIG. 16B, the dashed line between $Epsilon_{IM}$ and $Epsilon_{IS}$ illustrates how the strain in the inner belt 106 must increase as the inner belt progressively takes on load over the course of the booster. One may assume that when the two belts 102, 106 are brought together at the mating point, they do not expand or contract relative to each other; at least until load transfer begins. Thereafter, however, for there to be tension transfer between the two belts 102, 106, the carry belt 102 must contract and the inner belt 106 must elongate. Consequently, there is relative movement or creep at the interface between the carry and the internal belts 102, 106 unless the thickness of the two rubber cover layers at the interface is large enough to accommodate all of the required elongation. This latter circumstance would only be the case for very small relative elongations.

Figure 16C:
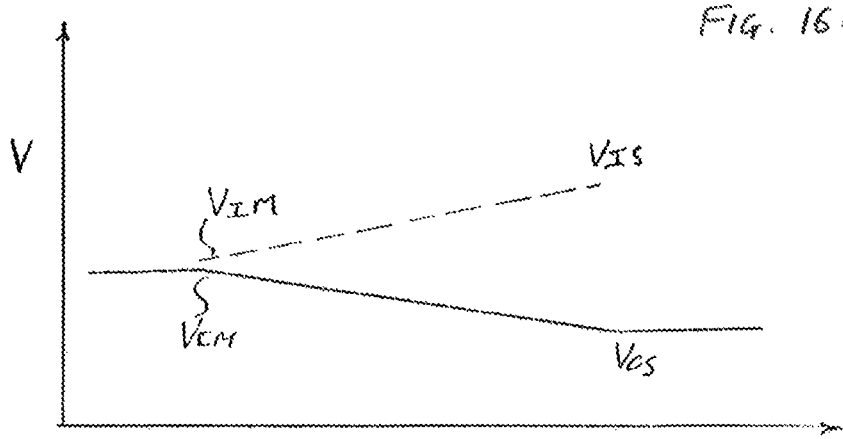
FIG. 16C qualitatively illustrates the local belt-velocity relationships that exist as a consequence of the strain or elongation effects described in connection with FIG. 16B.

FIG. 16C qualitatively illustrates the local belt-velocity relationships that exist as a consequence of the strain or elongation effects described in connection with FIG. 16B. Here the local velocity of a point on the inner belt 106 increases as the inner belt 106 stretches and the point approaches the head drive of the inner belt 106. The local velocities of the carry belt 102 and the inner belt 106 are diverging, with the maximum amount of difference occurring at the point of separation between the two belts 102, 106.

From this qualitative discussion, one may conclude that in the conventional short booster drives, there is relative movement or creep between points on the carry belt 102 and the inner belt 106. Despite this conclusion, practical experience has shown that this type of conventional drive has been valuable, contrary to theoretical concerns about tension transfer having to be limited to that level that will avoid belt creep between the two belts 102, 106.

Figure 17A:
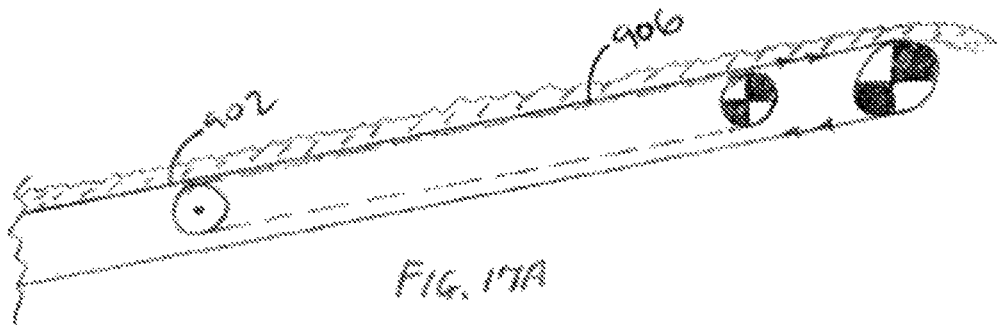
FIG. 17A is a schematic of the type of linear drive arrangement described in connection with FIGS. 4 through 15.

FIG. 17A is a schematic of the type of linear drive arrangement described in connection with FIGS. 4 through 15. FIG. 17A illustrates a carry belt 902 (solid lines) supported and driven through a frictional interface by an inner belt 906 (dashed lines). For a carry belt 906 that might be kilometers long, the inner belt 906 would typically extend along all or substantial lengths of the sloped portions of the conveyor, as described earlier.

Figure 17B:
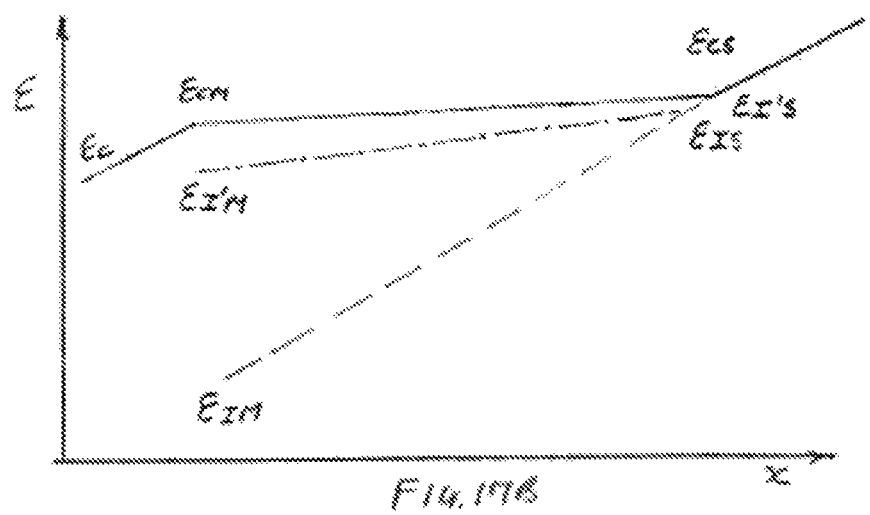
FIGS. 17B and 17C qualitatively illustrate the local strain and belt-velocity relationships that exist as a consequence of the strain or elongation effects that arise from the tension transfer between the two belts for the conveyor system shown in FIG. 17A.
Figure 17C:
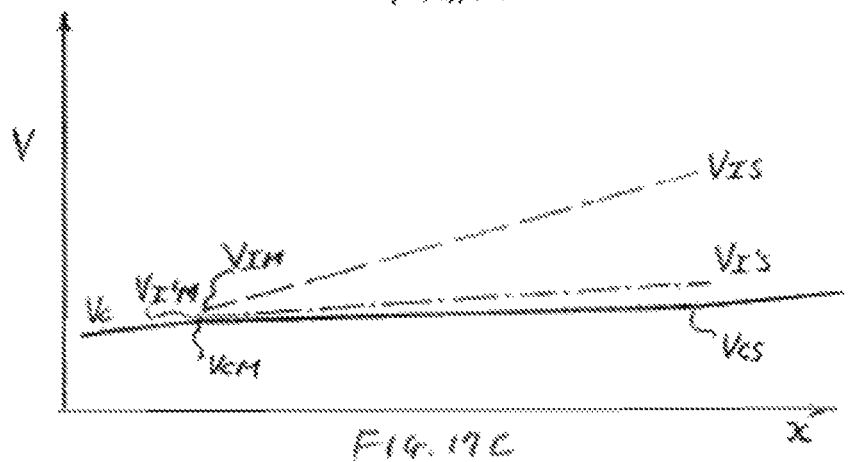

FIGS. 17B and 17C qualitatively illustrate the local strain and belt-velocity relationships that exist as a consequence of the strain or elongation effects that arise from the tension transfer between the two belts 902, 906. The reasoning is analogous to that used in the discussion of FIGS. 16A through 16C.

There is a significant difference between the elongation behavior of a short booster drive and that of the types of internal linear belt-drives of FIGS. 4 through 15. Whereas FIGS. 16B and 16C show the elongation and velocity of the carry belt 102 being reduced by the interaction with the inner belt 106, in the case of the embodiments shown in FIGS. 4-15, the interaction with the inner belt 906 is configured to keep the elongation and velocity of the carry belt 902 at about the same level as at the mating point, or perhaps at a slightly increasing level over the length traversed by the inner belt 906.

By the same logic as used previously, the lower degree of elongation of the inner belt 906 relative to the carry belt 902 results in a lower magnitude in the velocity differential between points on the carry belt 902 and corresponding points on the inner belt 906. This is illustrated in FIG. 17C. Hence, for the embodiments of conveyors shown in FIGS. 4 through 15, by arranging for the inner belt 906 to be significantly more stiff longitudinally than the carry belt 906, a designer may reduce the degree of relative movement between the belt surfaces.

The result of these latter configurations is that the divergence of local strain and local velocity between the carry and inner belts 902, 906 is less dramatic than in the case of conventional booster belt conveyors. Therefore any problems with tension transfer or belt wear are not likely to be any more significant than in the case of conventional booster drives, which is to say that they should be negligible.

These graphs are based on cases where the drives for the carry and inner belts 902, 906 are controlled to achieve matching velocities of the carry and inner belts 902, 906 at the point where the belts 902, 906 come into mating contact. Other velocity-control schemes may be adopted.

From the foregoing discussion, differential elongation between the carry belt 906 and the inner belt 906 should not present significant problems with respect to belt wear or tension transfer in the cases of the conveyor arrangements described herein, at least for the most probable belt properties. Nevertheless, in some embodiments, it may be desirable to put additional limits on the amount of relative elongation that occurs at the interface between the carry belt 902 and the inner belt 906. A conveyor designer's desire may be either to reduce belt wear or to better facilitate tension transfer between the inner belt 906 and the carry belt 902, or both.

This may be achieved by providing an inner belt 906 that is significantly stiffer than the carry belt 902, as illustrated by the dashed and dotted line between $Epsilon_{I'M}$ and $Epsilon_{I'S}$ in FIG. 17B. In this case this dashed and dotted line and the prime designation refer to an inner belt 906 that has significantly more longitudinal stiffness than the inner belt 906 whose strain variation is represented along the line between $Epsilon_{IM}$ and $Epsilon_{IS}$.

As suggested by the foregoing discussion, the amount of relative elongation may be minimized by arranging for the longitudinal stiffness of the inner belt 906 to be higher than that of the carry belt 902. In particular, where both the carry and inner belts 902, 906 are steel-cord belts, the inner belt 906 may have a longitudinal stiffness at least twice as high as that of the carry belt 902. In cases where even less differential elongation is desired, the inner belt 906 may have a longitudinal stiffness at least three to five times greater than that of the carry belt 902. These same ratios may apply to cases where the carry belt 902 is a fabric belt and the inner belt 906 is a steel-cord belt.

In most examples of conveyor engineering, the longitudinal stiffness of a conveyor belt of any particular carcass construction is determined by its longitudinal strength. Therefore, the differences in longitudinal stiffness called for above—while the strength of the belts is retained—might seem infeasible to one of ordinary skill in the art. However, the methods described below may be economically applied to achieve the required relative stiffness ratios.

The stiffness of the carry belt 902 may be reduced without significantly reducing its strength. A first method of achieving a significant stiffness reduction in a steel-cord carry belt is to reduce the nominal ST rating of the carry belt. This may be a natural or convenient approach in the case where most of the carry belt 902 traverses fairly level terrain, with most of the lift (and therefore the strength requirement) arising only on that length of the belt 902 that is supported by the internal linear drive belt 906.

A second method of achieving a significant stiffness reduction in a steel-cord carry belt 902 is to replace the central strand of the steel cables with a fiber strand. Such a substitution will reduce the stiffness of the belt 902 by about half, with only about a fifteen percent loss of longitudinal strength.

A third method of achieving a significant stiffness reduction in a steel-cord carry belt is to construct the strands of the steel cables using a more loosely-packed configuration, thereby providing room for the individual wires and strands more flex during loading.

A fourth method of achieving a significant stiffness reduction in a steel-cord carry belt 902 is to construct the strands of the steel cables with wires that include a continuous series of small local bends, thereby providing more longitudinal flexibility to the wires and to the overall cable.

The stiffness of the inner belt 906 may be increased without any significant economic disadvantage or inefficiency. A first method of achieving a significant stiffness increase in a steel-cord inner belt 906 relative to the outer belt 902 is to increase the nominal ST rating of the inner belt 906. This may be a natural or convenient approach in the case where most of the carry belt's 902 path traverses fairly level terrain, with most of the lift (and therefore the strength requirement) arising only on that length of the belt 902 that is supported by the internal linear drive belt 906. Since the inner belt 906 will most likely require a much higher strength rating than the carry belt 902, the longitudinal stiffness of the inner belt 906 will automatically be greater in proportion to the ST rating increase.

A second method of achieving a significant stiffness increase in a steel-cord inner belt 906 is to make the inner belt 902 significantly wider than the carry belt 902. The longitudinal stiffness will increase in proportion to the width. Since the inner belt 906 may only traverse a relatively short portion of the overall length of the conveyor, the increased width may be economically acceptable.

A third method of achieving a significant stiffness increase in a steel-corded or steel-roped inner belt 906, or alternatively in ropes constructed of other alternate materials, is to construct the steel cords or ropes of the inner belt 906 according to winding patterns known in the rope, or wire rope, industry for providing cords with greater longitudinal stiffness than obtained from typical wire rope constructions. The term "winding patterns" should be understood by one skilled in the art to not be limited to only wound wire ropes explicitly, but to include reference to the construction patterns of wire ropes of any known construction, including wound ropes, twisted ropes, braided ropes, etc. without limiting the scope of the present disclosure.

In some examples, it may be desired to configure the belt-on-belt drives so that load sharing between the external and internal belts does not result in any relative longitudinal movement or diverging strain levels between the internal and external belts over the course of their mated run. In other words, the desire may be to have the two belts act as if they were simply different plies of a single belt. One way to achieve this behavior is to arrange for the external belt to elongate or contract in unison with the internal belt as they progress along the slope. As with all the other cases above, the friction between the belts serves as the connection between the two belts, in this case allowing the two belts to act as a single compound belt, within limits that are typically not exceeded at the inclinations commonly encountered in trough conveying.

For simplicity of explanation, this description will proceed for the case where the conveyor is running uphill, resulting in extension of the belts. However, the principles apply equally to the case of a conveyor running downhill, where tension in the belts decreases and the belts contract longitudinally as the belts travel downhill.

For this example the external and internal belts are configured to exhibit no relative longitudinal movement while mated, so each of the two mated belts must extend by the same amount over the course of their mated run. In each belt, the amount of tension developed due to this shared amount of extension will be proportional to the longitudinal stiffness of each belt. For example, if the internal belt has a longitudinal stiffness that is three times greater than the longitudinal stiffness of the external belt, then the internal belt will accrue three times as much tension over the course of the mated run as the external belt. Therefore, by arranging for the external belt to have a longitudinal stiffness that is low compared to the combined stiffness of the external and internal belts, a designer can ensure that the additional load accrued by the external belt over the length of mated run does not require much additional strength in the external belt. It will be understood that a modest trade-off for arranging for there to be no relative movement between the mated belts is that the external belt must accrue some additional tension over the course of the slope, which may be more than the "zero or a moderately higher rate" of the previously-described embodiments.

As an illustration of this embodiment, the external belt may for example be configured to have a longitudinal stiffness of one unit, and the internal belt may be configured to have a longitudinal stiffness of three units. Then, the combined stiffness of the two belts would be four units, and therefore the external belt's stiffness would be one fourth of the compound stiffness. Therefore, when the external belt elongates as it traverses the part of the slope where it is mated to the internal belt, the external belt will accrue just one fourth of the total tension accrued along that part of the slope. The internal belt will accrue three fourths of that total tension.

In order to support the tension-sharing described in the above example, the drive pulleys (or "driveset") for the external belt and for the internal belt may be configured to apply torques directly proportional to the desired tension in each of the external and internal belts respectively. So, for example, one torque-control algorithm may consider the external driveset torque to comprise a first torque portion sufficient to move that part of the mass that is not over the internal belt, and to further comprise a second torque portion sufficient to move a share, or fractional percentage, of that part of the mass that is carried over the internal belt.

Figure 17D:
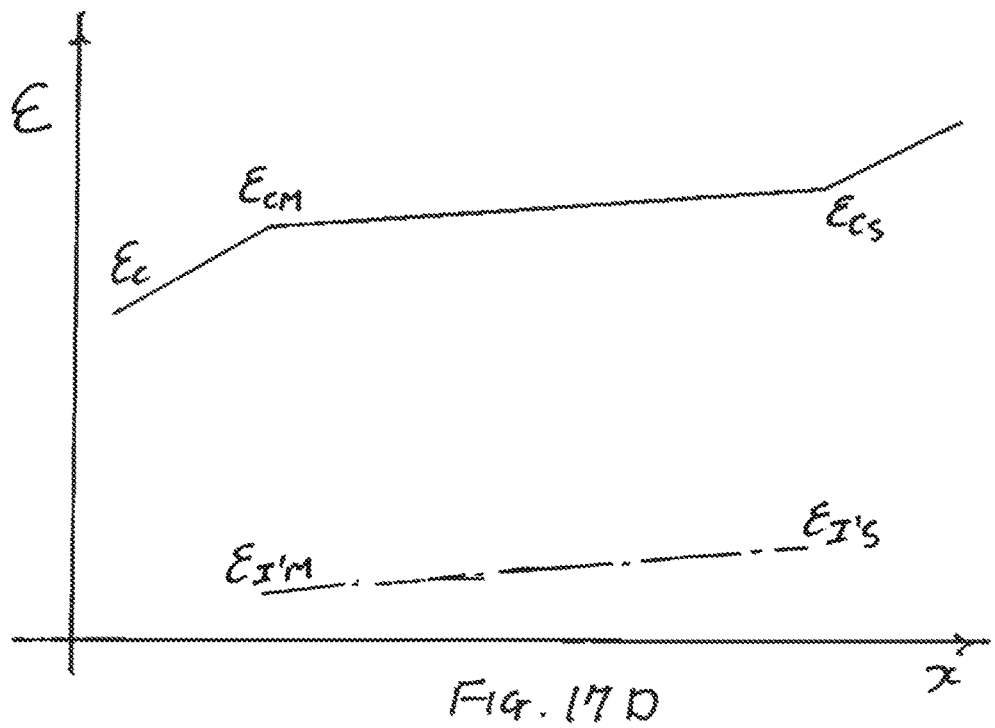
FIGS. 17D and 17E qualitatively illustrate the local strain and belt-velocity relationships that exist for an embodiment of the conveyor system shown in FIG. 17A, where the longitudinal belt stiffnesses and the drive torques have been configured to ensure that the external and internal belts experience no relative longitudinal movement over their mated run.

To further elaborate on such an algorithm, referring to FIG. 17D, let $E_U$ be a relatively higher level of tension in the external belt adjacent to and just upslope of the head pulley of the internal belt 906. Also, let $E_D$ be an intermediate level of tension in the external belt at a point adjacent to and just downslope of the tail pulley of the internal belt 906. Then the second torque portion that is sufficient to move a share of that part of the mass that is carried over the internal belt may be said to be directly proportional to the tension difference ($E_U$ minus $E_D$).

This control algorithm may further provide that the internal belt accrues a pre-determined amount of tension along that portion that supports the external belt, such that the amount of elongation of the internal belt substantially matches the amount of elongation sustained by the external belt under the tension difference ($E_U$ minus $E_D$). For purposes of explanation, let a longitudinal stiffness ratio of the longitudinal stiffness of the external belt to that of the internal belt be defined as $k_{rel}$. For example, in some cases the internal belt may be constructed to have a longitudinal stiffness about three times that of the external belt. In such a case, the value of $k_{rel}$ would be about 0.33.

In general, the desired matching of elongation will occur if the amount of tension accrued by the internal belt along that portion that supports the external belt is substantially equal to the quotient ($E_U$ minus $E_D$)/$k_{rel}$. So for the example above, if the tension accrued by the internal belt is three times that accrued by the external belt over that length where the belts are mated, then the external and internal belts will undergo substantially the same amounts of elongation and there will be no relative longitudinal movement between the belts.

For practical implementation of this control algorithm, the external belt tensions $E_U$ and $E_D$ may be obtained by continuously monitoring the belt tensions at the required locations by methods known in the art. These methods might include measurements related to belt sag and belt payload. Other such methods may include calculations to predict the belt tensions at the locations $E_U$ and $E_D$. Alternatively, if the head drive of external belt 902 is in relatively close proximity to the location for $E_U$, then the value of tension $E_U$ may easily be obtained from load-cell or torque measurements at the head or drive pulleys (respectively) for belt 902.

Figure 17E:
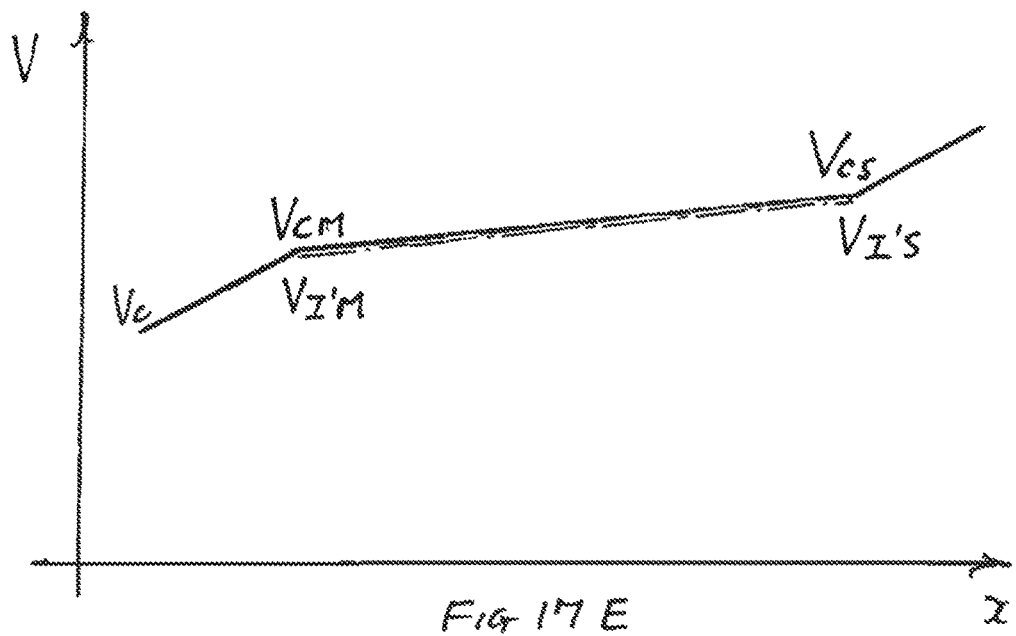

FIGS. 17D and 17E qualitatively illustrate the local strain and belt-velocity relationships respectively that exist for this last embodiment of the conveyor system shown in FIG. 17A, where the longitudinal stiffnesses and the drive torques have been configured to ensure that the external and internal belts experience no relative longitudinal movement over their mated run. The graphs illustrate the case where the inner belt 906 is significantly stiffer than the carry belt 902. In FIG. 17D, the dashed and dotted line between $\text{Epsilon}_{FM}$ and $\text{Epsilon}_{FS}$ represents the increasing strain in the inner belt 906 over the length of its mated run with the external belt 902. The solid line between $\text{Epsilon}_{CM}$ and $\text{Epsilon}_{CS}$ represents the increasing strain in the external belt 902 over the length of its mated run with the internal belt 906. The graph illustrates that along the length of mated run, the strains in the external and internal belts increase at the same rate, and therefore no relative longitudinal movement between the two belts is required to accommodate different strain increments in the two belts.

FIG. 17E shows the velocity relationships between the external and internal belts for this last embodiment of the conveyor system shown in FIG. 17A and FIG. 17D. The dashed and dotted line between $V_{FM}$ and $V_{FS}$ represents the increasing velocity in the inner belt 906 as it gradually elongates over the length of its mated run with the external belt 902. The solid line between $V_{CM}$ and $V_{CS}$ represents the increasing velocity in the carry (external) belt 902 over the length of its mated run with the internal belt 906. Note that in FIG. 17E, the location of the annotations $V_{CM}$ and $V_{CS}$ and $V_{FM}$ and $V_{FS}$ only indicate their longitudinal location along the conveyor, and not the line in the graph that they are associated with. For clarity, the velocity curves for the external and external belts have been shown just adjacent to each other, but in fact they fall exactly over each other. The graph illustrates that along the length of mated run, the local velocities in the external and internal belts increase at the same rate, and therefore no relative longitudinal movement between the two belts is required to accommodate different velocity increments in the two belts.

For any of the previously discussed embodiments, the external belts and the internal belts may have substantial longitudinal strength and/or substantially similar allowable tension ratings. The external belts and the internal belts may include steel-cord belts or other suitable belts. The external belts and the internal belts may have substantially similar width dimensions or may have different width dimensions. The unloading mechanisms, the load-superposition mechanisms and related methods thereof described with respect to the first example of conveyor systems may also be used with any of the other examples of conveyor systems.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A conveyor system, at least one portion of the conveyor system traversing a continuous slope sufficiently steep such that tensile forces associated with overcoming the effects of the continuous slope are several times larger per unit length of run than tensile forces per unit length of run due to main frictional resistance of the conveyor system, the conveyor system comprising:

an external belt defining a continuous loop, the continuous loop traversing the entire route of the conveyor system and configured to carry material load to be transported across the entire route;

an external drive having a first torque output;

at least one internal belt positioned inside the continuous loop of said external belt and traversing at least a portion of the continuous slope, an upper side of said at least one internal belt configured to operably engage an underside of said external belt so as to frictionally drive a portion of said external belt;
wherein said at least one internal belt has a tensile capacity sufficient to move at least a mass of the material load that is disposed over said at least one internal belt, and said external belt further has a tensile capacity sufficient to move substantially a mass of the material load that is not disposed over said at least one internal belt; and wherein a longitudinal stiffness of said at least one internal belt is at least as stiff as a longitudinal stiffness of said external belt; and
an internal drive having a second torque output, wherein the first torque output is approximately equal to the torque required to move a total mass of the portion of said external belt not resting on said at least one internal belt and the second torque output is approximately equal to the torque required to move a total mass of the portion of said external belt resting on said at least one internal belt.

2. The conveyor system of claim 1, wherein the longitudinal stiffness of said at least one internal belt is greater than the longitudinal stiffness of said external belt.

3. The conveyor system of claim 2, wherein each of said external belt and at least one internal belt comprises a plurality of tension members running the length of the respective belts, and wherein the greater longitudinal stiffness of the at least one internal belt relative to the longitudinal stiffness of the external belt is caused by one or more of,
a. said at least one internal belt having a greater ST rating than said external belt,
b. said tension members of said at least one internal belt being constructed to have a first winding pattern, and said tension members of said external belt being constructed to have a second winding pattern, said first winding pattern producing a greater stiffness in said tension members of said at least one internal belt than a stiffness produced by said second winding pattern of said tension members of said external belt, or
c. said tension members of the external belt comprising a plurality of load-carrying members stranded about a central core, wherein the central core is constructed of a material that is radially compressible and has a lower longitudinal stiffness than the load-carrying members.

4. A conveyor system, at least one portion of the conveyor system traversing a continuous slope sufficiently steep such that tensile forces associated with overcoming the effects of the continuous slope are several times larger per unit length of run than tensile forces per unit length of run due to main frictional resistance of the conveyor system, the conveyor system comprising:
an external belt defining a continuous loop, the continuous loop traversing the entire route of the conveyor system, said external belt being configured to carry a material load to be transported across the entire route;
an external drive configured to at least partially drive said external belt;
at least one internal belt positioned inside the continuous loop of the external belt and traversing at least a portion of the continuous slope, an upper side of the at least one internal belt configured to operatively engage an underside of the external belt so as to frictionally drive a portion of the external belt, wherein the stiffness of the internal belt is at least as stiff as the external belt, wherein said at least one internal belt has a tensile capacity sufficient to move at least a mass of the material load that is disposed over said at least one internal belt, and said external belt further has a tensile capacity sufficient to move substantially a mass of the material load that is not disposed over said at least one internal belt; and
an internal drive configured to drive at least said at least one internal belt.

5. The conveyor system of claim 4, wherein said at least one internal belt is configured to at least one of transition from a substantially flat configuration to a substantially fully troughed configuration at a tail of said at least one internal belt so as to operatively engage said external belt along an area of engagement defined between said external and at least one internal belt, or transition from the substantially fully troughed configuration to the substantially flat configuration at a head of said at least one internal belt so as to operably disengage from said external belt.

6. The conveyor system of claim 5, wherein when said at least one internal belt engages with said external belt, said external belt forms into a trough having steeper sides than said troughed configuration of said at least one internal belt, in said area of engagement.

7. The conveyor system of claim 5, further comprising a plurality of carry idlers disposed beneath one or more of said external belt and said at least one internal belt along a longitudinal length of said respective belts, wherein a spacing between successive carry idlers disposed in the area of engagement is different than a spacing between carry idlers disposed outside the area of engagement.

8. The conveyor system of claim 5, further comprising a support mechanism that facilitates at least one transition length of engagement or disengagement of the external belt and the at least one internal belt, said support mechanism comprising at least one of air-support panels, slider pads, or small-diameter idlers.

9. The conveyor system of claim 8, wherein the support mechanism is supported from above such that at least portions of lateral trough walls of said at least one internal belt are in close proximity to at least portions of lateral trough walls of said external belt.

10. The conveyor system of claim 5, wherein said external belt is flattened to facilitate at least one of engaging and disengaging said at least one internal belt.

11. The conveyor system of claim 10, further comprising a cover belt disposed above and in operative communication with said external belt, and configured to form an inverted trough to contain a material load on said external belt when said external belt is in a flattened state.

12. The conveyor system of claim 4, further comprising:
at least a first drive pulley in operative communication with said external belt and configured to drive said external belt;
at least a second drive pulley in operative communication with said internal belt and configured to drive said at least one internal belt; and
a control system configured to control a speed of at least one of said at least first or at least second drive pulleys driving said respective external belt or at least one internal belt to achieve correct progression of each respective belt.

13. The conveyor system of claim 12, wherein said control system controls said external belt and said at least one internal belt to progress at a substantially similar speed.

14. The conveyor system of claim 4, further comprising a control system configured to control a torque directed to at least one of a drive pulley of said external belt or a drive pulley of said at least one internal belt to ensure that each respective belt carries a proportionate share of a total tension and that a friction capacity of the interface between said respective belts is not exceeded.

15. The conveyor system of claim 14, wherein said conveyor system further comprises a belt scale installed near a tail of said external belt and configured to continuously measure a mass of payload passing over said external belt, wherein said control system comprises a load profile component and a drive control component, said load profile component being configured to use measurements taken by said belt scale to calculate a load profile of the entire conveyor system, and wherein said drive control component being configured to use the load profile of the entire conveyor system to proportion load to said respective drive pulleys for said at least one internal belt and for said external belt to ensure that each respective drive pulley is driving to the appropriate extent.

16. The conveyor system of claim 4, wherein a longitudinal stiffness of said at least one internal belt is greater than a longitudinal stiffness of said external belt.

17. The conveyor system of claim 16, wherein each of said external belt and at least one internal belt comprises a plurality of tension members running the length of the respective belts, wherein the longitudinal stiffness of said at least one internal belt is greater than the longitudinal stiffness of said external belt, and wherein the greater longitudinal stiffness of said at least one internal belt relative to the longitudinal stiffness of said external belt is achieved by one or more of,
  a. said at least one internal belt having a greater ST rating than said external belt;
  b. said tension members of said at least one internal belt being constructed to have a first winding pattern, and said tension members of said external belt being constructed to have a second winding pattern, said first winding pattern producing a greater stiffness in said tension members of said at least one internal belt than a stiffness produced by said second winding pattern of said tension members of said external belt, or
  c. said tension members of said external belt comprising a plurality of load-carrying members stranded about a central core, wherein the central core is constructed of a material that is radially compressible and has a lower longitudinal stiffness than the load-carrying members.

18. A conveyor system, at least one portion of the conveyor system traversing a continuous slope sufficiently steep such that tensile forces associated with overcoming the effects of the continuous slope are several times larger per unit length of run than tensile forces per unit length of run due to main frictional resistance of the conveyor system, the conveyor system comprising:
  an external belt defining a continuous loop, the continuous loop traversing the entire route of the conveyor system and configured to carry material load to be transported across the entire route;
  at least one internal belt positioned inside the continuous loop of the external belt and traversing at least a portion of the continuous slope, an upper side of the at least one internal belt configured to operably engage an underside of the external belt so as to frictionally drive a portion of the external belt, wherein a longitudinal stiffness of the internal belt is greater than a longitudinal stiffness of the external belt; and
  at least a first drive pulley in operative communication with said external belt and configured to exert an external driveset torque to drive said external belt, said external driveset torque having
    a first torque portion sufficient to move a mass of the material load that is not disposed over said at least one internal belt, and
    a second torque portion sufficient to move a first share of a mass of the material load that is disposed over said at least one internal belt; and
  at least a second drive pulley in operative communication with said internal belt and configured to exert an internal driveset torque to drive said at least one internal belt,
  wherein a sum of said internal driveset torque and said second torque portion is approximately equal to an amount of torque required to move a total mass of the material load that is disposed over said at least one internal belt, and
  wherein a ratio of said second torque portion to said internal driveset torque is substantially equal to a ratio of the longitudinal stiffness of said external belt to the longitudinal stiffness of said at least one internal belt.

19. The conveyor system of claim 18, wherein each of said external belt and at least one internal belt comprises a plurality of tension members running the length of the respective belts, and wherein the greater longitudinal stiffness of said at least one internal belt relative to the longitudinal stiffness of said external belt is achieved by one or more of,
  a. said at least one internal belt having a greater ST rating than said external belt;
  b. said tension members of said at least one internal belt being constructed to have a first winding pattern, and said tension members of said external belt being constructed to have a second winding pattern, said first winding pattern producing a greater stiffness in said tension members of said at least one internal belt than a stiffness produced by said second winding pattern of said tension members of said external belt, or
  c. said tension members of said external belt comprising a plurality of load-carrying members stranded about a central core, wherein the central core is constructed of a material that is radially compressible and has a lower longitudinal stiffness than the load-carrying members.

* * * * *